US008675209B2

(12) United States Patent
Usami

(10) Patent No.: US 8,675,209 B2
(45) Date of Patent: Mar. 18, 2014

(54) OPTICAL DISPLACEMENT METER

(75) Inventor: Jun Usami, Osaka (JP)

(73) Assignee: Keyence Corporation, Osaka (JP)

( * ) Notice: Subject to any disclaimer, the term of this patent is extended or adjusted under 35 U.S.C. 154(b) by 147 days.

(21) Appl. No.: 13/304,749

(22) Filed: Nov. 28, 2011

(65) Prior Publication Data
US 2012/0154807 A1 Jun. 21, 2012

(30) Foreign Application Priority Data
Dec. 17, 2010 (JP) .................................. 2010-281231

(51) Int. Cl.
*G01B 11/14* (2006.01)
(52) U.S. Cl.
USPC .......................................... 356/614; 356/623
(58) Field of Classification Search
None
See application file for complete search history.

(56) References Cited

U.S. PATENT DOCUMENTS 5,920,394 A * 7/1999 Gelbart et al. ................ 356/615
6,476,943 B1 * 11/2002 Yertoprakhov ................. 359/15
7,639,373 B2 * 12/2009 Torii et al. ..................... 356/614

FOREIGN PATENT DOCUMENTS

JP 2008-096117 4/2008

* cited by examiner

*Primary Examiner* — Gordon J Stock, Jr.
(74) *Attorney, Agent, or Firm* — Kilyk & Bowersox, P.L.L.C.

(57) ABSTRACT

Provided is an optical displacement meter capable of accurately detecting a displacement of an object. A light-projecting part selectively irradiates a workpiece with first and second light whose polarization directions are different from each other. Reflected light from the workpiece is incident on a light-receiving element through a light-receiving lens. A waveform creating part creates first and second waveform data showing light-receiving amount distributions of the first and second light obtained by the light-receiving element. A waveform processing part calculates a ratio between mutually corresponding peaks in the first and second waveform data, and selects one peak from each of the first and second waveform data based on the calculated ratios, to detect a position of the peak.

11 Claims, 17 Drawing Sheets

PROFILE DATA

OPTICAL DISPLACEMENT METER

CROSS-REFERENCE TO RELATED APPLICATIONS

The present application claims foreign priority based on Japanese Patent Application No. 2010-281231, filed Dec. 17, 2010, the contents of which is incorporated herein by reference.

BACKGROUND OF THE INVENTION

1. Field of the Invention

The present invention relates to an optical displacement meter for detecting a displacement of an object by a triangulation system.

2. Description of Related Art

In a triangulation system optical displacement meter, a surface of an object (hereinafter referred to as "workpiece") is irradiated with light, and the reflected light thereof is received by a light-receiving element having one-dimensionally or two-dimensionally aligned pixels. A height of the surface of the workpiece can be measured based on a peak position of a light-receiving amount distribution obtained by the light-receiving element. It is thereby possible to detect a displacement of the workpiece (e.g., Japanese Unexamined Patent Publication No. 2008-96117).

In an optical-cutting system optical displacement meter, the workpiece is irradiated with band-like light having a linear cross section, and the reflected light thereof is received by a two-dimensional light-receiving element. A light-receiving amount distribution obtained by the light-receiving element is amplified by an amplifier, and then converted to digital waveform data. Based on a peak position of this waveform data, a sectional shape of the workpiece is detected.

However, in the above optical displacement meter, light with which the workpiece has been irradiated may be reflected more than once on the surface of the workpiece. The light reflected more than once is incident on the light-receiving element, to cause appearance of a plurality of peaks in the waveform data. This prevents acquirement of an accurate sectional shape of the workpiece.

SUMMARY OF THE INVENTION

An object of the present invention is to provide an optical displacement meter capable of accurately detecting a displacement of an object.

(1) An optical displacement meter of the present invention is an optical displacement meter that detects a peak position of reflected light from an object, to detect a displacement of the object by a triangulation system, the meter including: a light-projecting part which irradiates the object with light; a light-receiving part which receives first light containing a first linear polarization component and second light containing a second linear polarization component that is different from the first linear polarization component, in a mutually discriminable manner; a light-receiving amount distribution acquiring part which acquires a light-receiving amount distribution of the first light obtained by the light-receiving part as a first light-receiving amount distribution, and a light-receiving amount distribution of the second light obtained by the light-receiving part as a second light-receiving amount distribution; a peak position detecting part which calculates, based on the first and second light-receiving amount distributions acquired by the light-receiving amount distribution acquiring part, discrimination information for discriminating between a position of a false peak due to light reflected on the surface of the object more than once and a position of a true peak due to light reflected thereon once, to specify the true peak position based on the calculated discrimination information; and a measurement processing part which calculates a displacement of the object corresponding to the true peak position specified by the peak position detecting part.

In this optical displacement meter, the object is irradiated with light by the light-projecting part, and the reflected light thereof is received by the light-receiving part as the first light made up of the first linear polarization component and as the second light made up of the second linear polarization component, in a mutually discriminable manner. The light-receiving amount distribution of the first light obtained by the light-receiving part is acquired by the light-receiving amount distribution acquiring part as the first light-receiving amount distribution, and the light-receiving amount distribution of the second light obtained by the light-receiving part is acquired by the light-receiving amount distribution acquiring part as the second light-receiving amount distribution.

At the time of reception of the reflected light from the object, there is a case where light reflected once on the object is received by the light-receiving part as the first and second light, while light reflected more than once on the object is received by the light-receiving part as the first and second light. In this case, a true peak due to the once-reflected light and a false peak due to the more-than-once reflected light appear in the first and second light-receiving amount distributions.

Herein, a reflectance of the first linear polarization component and a reflectance of the second linear polarization component are different. Thereat, when the first and second linear polarization components of the light with which the object has been irradiated have the same intensity, the first and second linear polarization components of the reflected light have different intensities. For this reason, the first and second light that are received have different intensities.

Further, the intensities of the first and second linear polarization components of the more-than-once reflected light are values obtained by multiplying the intensities of the first and second linear polarization components of the light, with which the object has been irradiated, by the reflectances more than once. Thereby, the ratio between the intensities of the first and second light in the case of the more-than-once reflected light being received as the first and second light is different from the ratio between the intensities of the first and second light in the case of the once-reflected light being received as the first and second light.

Thereat, discrimination information for discriminating a position of a false peak due to the more-than-once reflected light and a position of a true peak due to the once-reflected light is calculated by the peak position detecting part based on the first and second light-receiving amount distributions. The true peak position can be specified based on the calculated discrimination information. A displacement of the object corresponding to the specified true peak position is calculated by the measurement processing part. This can prevent erroneous calculation of a value corresponding to the false peak position as a displacement of the object, so as to obtain a value corresponding to the true peak position as an accurate displacement of the object.

(2) The peak position detecting part may detect a peak position in the first light-receiving amount distribution acquired by light-receiving amount distribution acquiring part as a first peak position and may detect a peak position in the second light-receiving amount distribution as a second peak position, to calculate as the discrimination information a relative value between light-receiving amounts of the mutually corresponding first and second peak positions.

As described above, the ratio between the intensities of the first and second light in the case of the more-than-once reflected light being received as the first and second light is different from the ratio between the intensities of the first and second light in the case of the once-reflected light being received as the first and second light. For this reason, the ratio between a value of the peak that appears in the first light-receiving amount distribution and a value of the peak that appears in the second light-receiving amount distribution due to the more-than-once reflected light is different from the ratio between a value of the peak that appears in the first light-receiving amount distribution and a value of the peak that appears in the second light-receiving amount distribution due to the once-reflected light.

It is thereby possible to specify the true peak position due to the once-reflected light based on the relative value between the light-receiving amount of the peak position in the first light-receiving amount distribution and the light-receiving amount of the peak position in the second light-receiving amount distribution. Accordingly, it is possible to obtain an accurate displacement of the object.

(3) The peak position detecting part may calculate as the discrimination information a relative relation between the first and second light-receiving amount distributions acquired by the light-receiving amount distribution acquiring part.

In this case, based on the relative relation between the first and second light-receiving amount distributions, the true peak position due to the once-reflected light can be specified. It is thereby possible to obtain an accurate displacement of the object.

(4) The light-projecting part may be configured so as to selectively irradiate the object with the first and second light.

In this case, the first light is received by the light-receiving part by irradiation of the object with the first light from the light-projecting part, and the second light is received by the light-receiving part by irradiation of the object with the second light from the light-projecting part. In this case, it is possible to make the light-receiving part selectively receive the first and second light with a simple configuration under simple control.

(5) The light-projecting part may include: first and second light-projecting elements which generate light; a first optical system which guides, as the first light, light that is generated by the first light-projecting element to the object; and a second optical system which guides, as the second light, light that is generated by the second light-projecting element to the object.

In this case, by making the first and second light-projecting elements selectively generate light, it is possible to selectively irradiate the object with the first and second light from the light-projecting part with a simple configuration under simple control.

(6) The light-projecting part may include: a common light-projecting element which generates light; and a polarization component controlling part which controls a polarization component of light that is generated by the common light-projecting element, to irradiate the object with the first and second light.

In this case, it is possible to selectively irradiate the object with the first and second light from the light-projecting part with a simple configuration under simple control.

(7) The light-projecting part may be configured so as to irradiate the object with common light containing the first and second linear polarization components, and the light-receiving part may further include: a light-receiving element; and a light reception selecting part which selectively guides, as the first and second light, the common light reflected by the object to the light-receiving element.

In this case, it is possible to make the light-receiving part selectively receive the first and second light, while simplifying a configuration of the light-projecting part.

(8) The discrimination information may include a ratio between a value of the peak that appears in the first light-receiving amount distribution and a value of the peak that appears in the second light-receiving amount distribution. In this case, it is possible to accurately specify the true peak position due to the once-reflected light based on the first and second light-receiving amount distributions.

(9) The discrimination information may include a difference between a value of the peak that appears in the first light-receiving amount distribution and a value of the peak that appears in the second light-receiving amount distribution. In this case, it is possible to accurately specify the true peak position due to the once-reflected light based on the first and second light-receiving amount distributions.

(10) The discrimination information may include a value obtained by computing by use of the values of the peaks that appear in the first and second light-receiving amount distribution and a previously set coefficient. In this case, it is possible to accurately specify the true peak position due to the once-reflected light based on the first and second light-receiving amount distributions.

(11) A polarization direction of the first light and a polarization direction of the second light may be different from each other by 90 degrees.

In this case, it is possible to make large the difference between the reflectance of the first light and the reflectance of the second light. It is thereby possible to make large the difference between the ratio of the intensities of the first and second light in the case of the more-than-once reflected light being received as the first and second light and the ratio between the intensities of the first and second light in the case of the once-reflected light being received as the first and second light. Accordingly, it is possible to readily and accurately select the true peak position due to the once-reflected light based on the first and second light-receiving amount distributions.

According to the present invention, it is possible to accurately select a true peak position due to once-reflected light. This can result in accurate detection of a displacement of an object.

DETAILED DESCRIPTION OF PREFERRED EMBODIMENTS

Hereinafter, as an optical displacement meter according to embodiments of the present invention, an optical-cutting system optical displacement meter will be described with reference to the drawings.

(1-1) Configuration of Optical Displacement Meter

Figure 1:
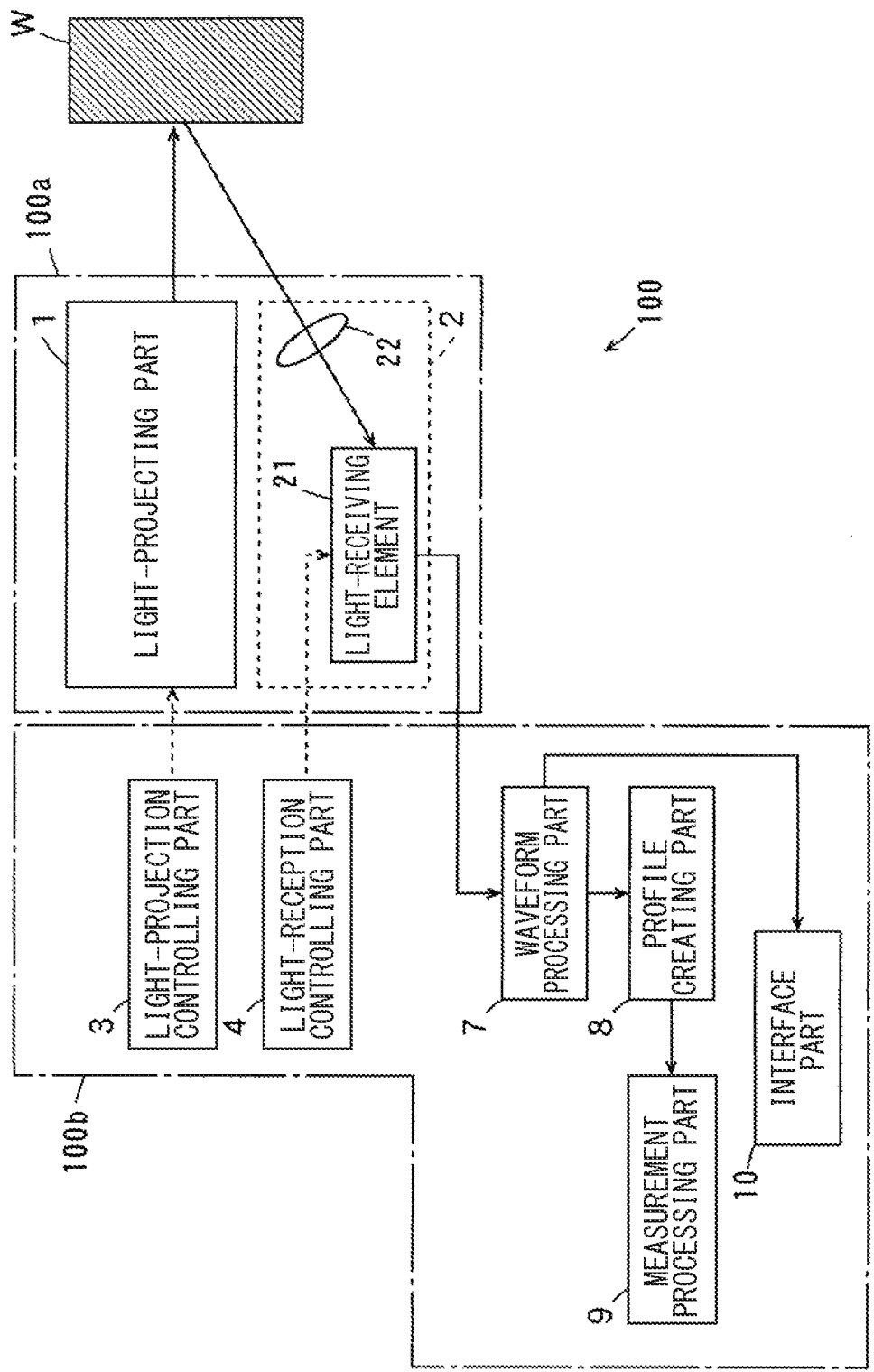
FIG. 1 is a block diagram showing a configuration of an optical displacement meter according to a first embodiment.

FIG. 1 is a block diagram showing a configuration of an optical displacement meter according to a first embodiment. As shown in FIG. 1, an optical displacement meter 100 is provided with a light-projecting/light-receiving part 100a, and a control part 100b. The light-projecting/light-receiving part 100a includes a light-projecting part 1 and a light-receiving part 2. The control part 100b includes a light-projection controlling part 3, a light-reception controlling part 4, a waveform processing part 7, a profile creating part 8, a measurement processing part 9, and an interface part 10.

The light-projecting part 1 is configured such that it can irradiate an object (hereinafter referred to as workpiece) W with two kinds of band-like light whose polarization directions are different from each other. Details of the light-projecting part 1 will be described later. The light-receiving part 2 includes a light-receiving element 21 and a light-receiving lens 22. Reflected light from the workpiece W is incident on the light-receiving element 21 through the light-receiving lens 22. The light-receiving element 21, for example, includes a CMOS (Complementary Metal Oxide Semiconductor) sensor, and has a plurality of two-dimensionally arranged pixels. A light-receiving amount distribution of the light-receiving element 21 is outputted as an analog light-receiving signal. The light-projection controlling part 3 controls light irradiation timing, light intensity, and the like of the light-projecting part 1, and the light-reception controlling part 4 controls light-reception timing and the like of the light-receiving element 21.

The waveform processing part 7 includes an amplifier and an analog/digital converter. A light-receiving signal outputted from the light-receiving element 21 is amplified by the amplifier, and then analog/digital converted by the analog/digital converter. Digital waveform data is thereby obtained. The waveform processing part 7 detects a peak position from the obtained waveform data.

The profile creating part 8 creates profile data representing a sectional shape of the workpiece W based on the peak position detected by the waveform processing part 7. The measurement processing part 9 performs correction processing and measurement processing on the profile data created by the profile creating part 8. Herein, the measurement processing is processing for calculating a size (displacement) of an arbitrary portion of the surface of the workpiece W based on profile data.

The waveform data obtained by the waveform processing part 7 is taken outside through the interface part 10. Further, the user can perform a variety of settings and inputs through the interface part 10.

(1-2) Summary of Operation

Figure 2:
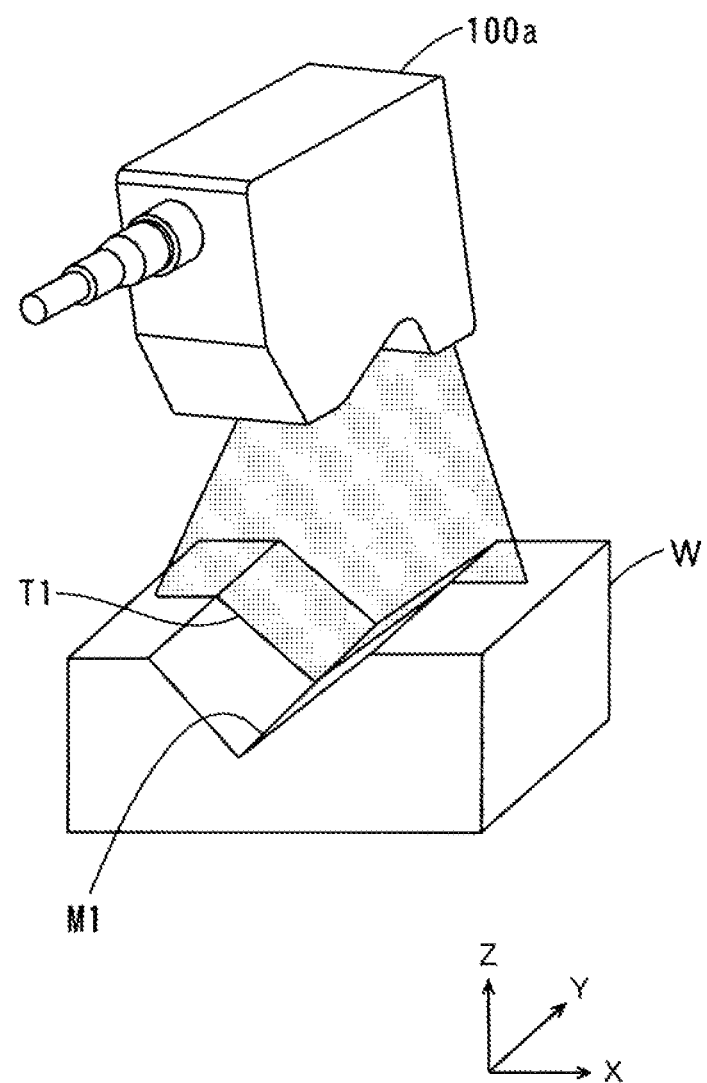
FIG. 2 is an external perspective view of a light-projecting/light-receiving part and a workpiece.
Figure 3:
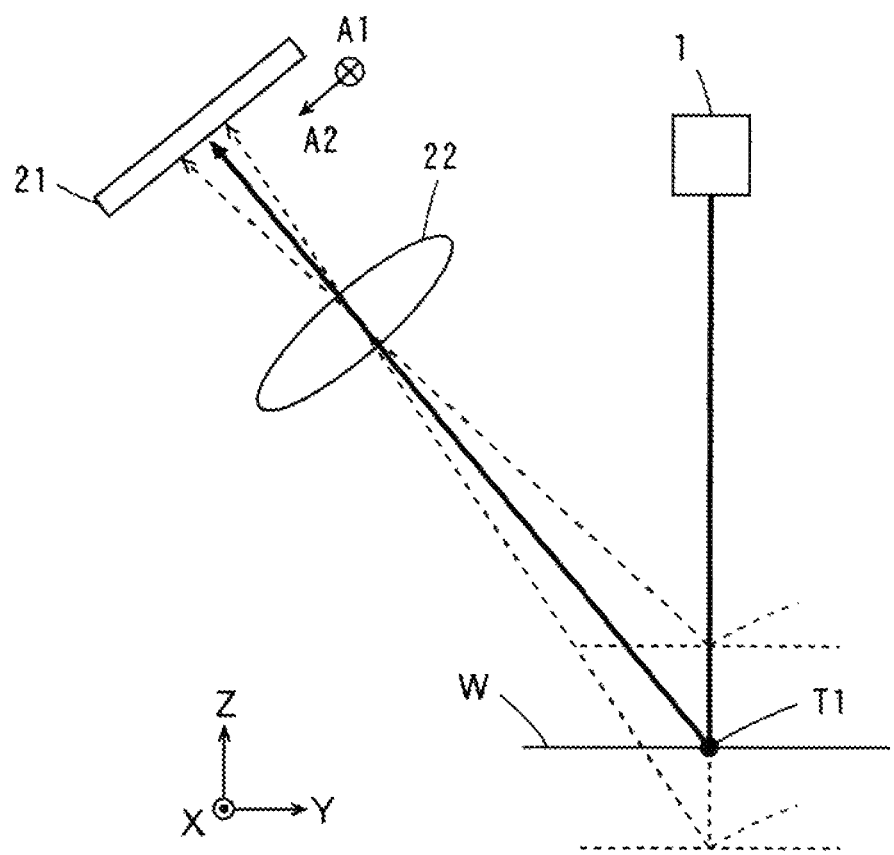
FIG. 3 is a view showing a relation between a light irradiation position on the surface of the workpiece and a light incident position on a light-receiving element.
Figure 4:
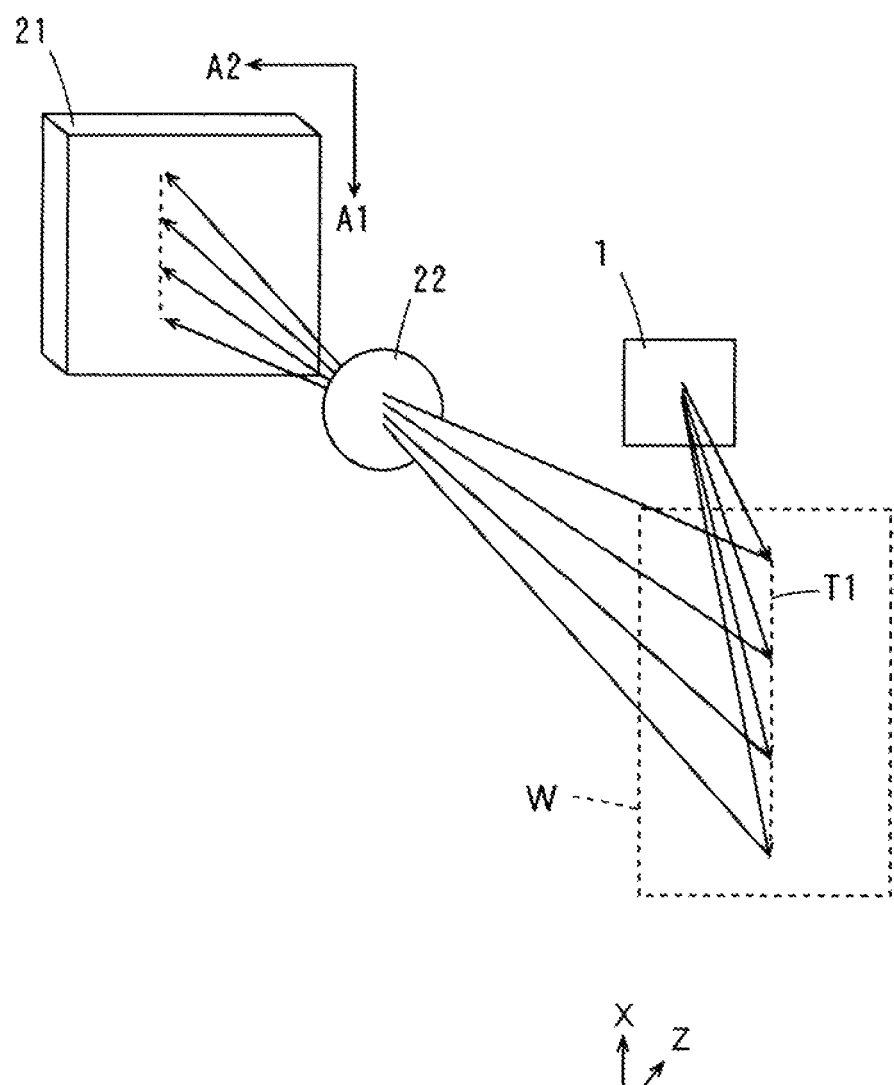
FIG. 4 is a view showing a relation between a light irradiation position on the surface of the workpiece and a light incident position on the light-receiving element.

A summary of the operation of the optical displacement meter 100 will be described. FIG. 2 is an external perspective view of the light-projecting/light-receiving part 100a and the workpiece W. FIGS. 3 and 4 are views each showing the relation between a light irradiation position on the surface of the workpiece W and a light incident position on the light-receiving element 21. In FIGS. 2 to 4, two directions orthogonal to each other within a horizontal plane are defined as a direction X and a direction Y and indicated by arrows X, Y, and a vertical direction is defined as a direction Z and indicated by an arrow Z. In FIGS. 3 and 4, two directions orthogonal to each other on a light-receiving surface of the light-receiving element 21 are defined as a direction A1 and a direction A2 and indicated by arrows A1, A2. Herein, the light-receiving surface is a surface formed by a plurality of pixels of the light-receiving element 21.

In the example of FIG. 2, a groove M1 extending in the direction Y and having a V-shaped cross section is formed on the surface of the workpiece W. The light-projecting/light-receiving part 100a irradiates the surface of the workpiece W with band-like light along the direction X. Hereinafter, a linear area on the surface of the workpiece W which is irradiated with the band-like light is referred to as an irradiated area T1.

As shown in FIG. 3, light reflected in the irradiated area T1 is incident on the light-receiving element 21 through the light-receiving lens 22. In this case, when a light reflected position in the irradiated area T1 varies in the direction Z, a reflected-light incident position on the light-receiving element 21 varies in the direction A2. Further, as shown in FIG. 4, when a light reflected position in the irradiated area T1 varies in the direction X, a reflected-light incident position on the light-receiving element 21 varies in the direction A1.

Herewith, the light incident position in the direction A2 of the light-receiving element 21 represents the position (height) in the direction Z of the irradiated area T1, and the light incident position in the direction A1 of the light-receiving element 21 represents the position in the direction X of the irradiated area T1.

Figure 5:
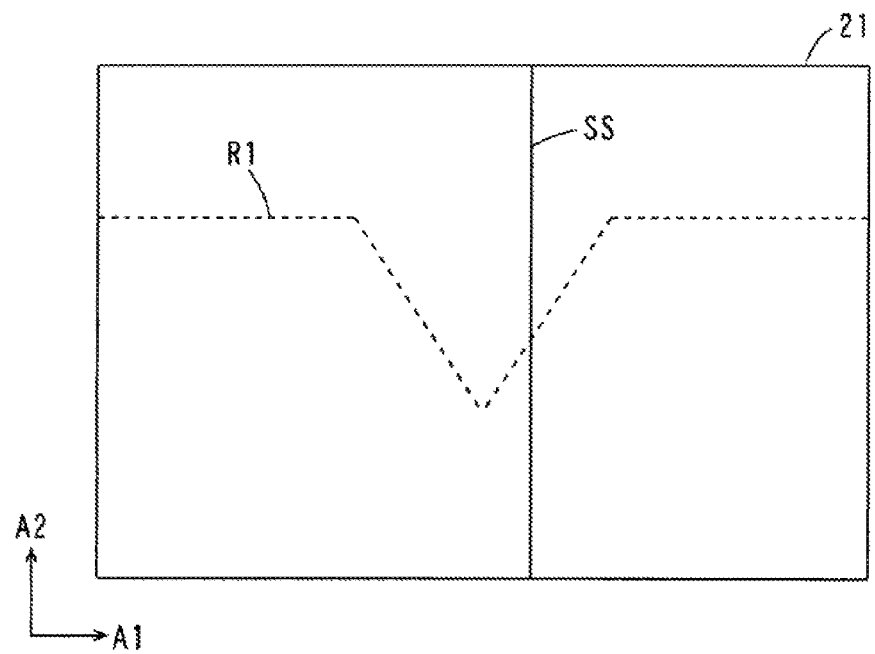
FIG. 5 is a view showing a light-receiving amount distribution on a light-receiving surface of the light-receiving element.

FIG. 5 is a view showing a light-receiving amount distribution on the light-receiving surface of the light-receiving element 21. A plurality of pixels of the light-receiving element 21 are two-dimensionally arranged so as to be along the direction A1 and the direction A2. The light reflected in the irradiated area T1 of FIG. 2 is incident on a linear light-receiving area R1 of FIG. 5. This increases the light-receiving amount of the light-receiving area R1.

Figure 6:
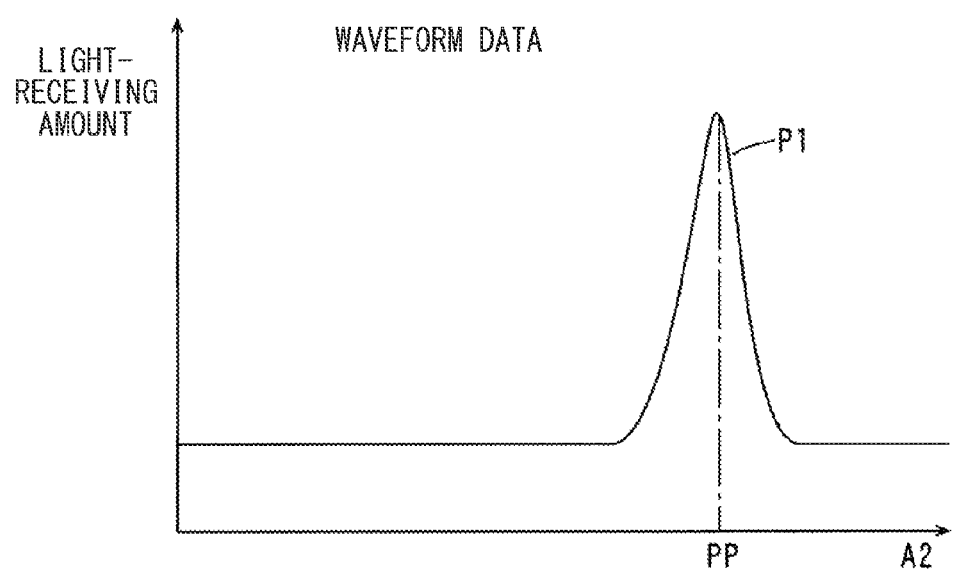
FIG. 6 is a diagram showing waveform data that shows the light-receiving amount distribution of FIG. 5.

The light-receiving amount distribution of FIG. 5 is outputted as an analog light-receiving signal with respect to each row of pixels (hereinafter referred to as pixel row) along the direction A2. Based on the outputted light-receiving signal, waveform data with respect to each pixel row is created by the waveform processing part 7. FIG. 6 is a diagram showing waveform data of a pixel row SS of FIG. 5. In FIG. 6, a horizontal axis shows the direction A2, and a vertical axis shows the light-receiving amount.

As shown in FIG. 6, a peak P1 corresponding to the light-receiving area R1 of FIG. 5 appears in the waveform data. A position (hereinafter referred to as peak position) PP of the peak P1 shows a height of the corresponding place in the irradiated area T1. One peak position PP is detected by the waveform processing part 7 in each waveform data. Based on the peak positions PP detected in all the waveform data, profile data showing a sectional shape (shape of the irradiated area T1) of the workpiece W is created by the profile creating part 8.

Figure 7A:
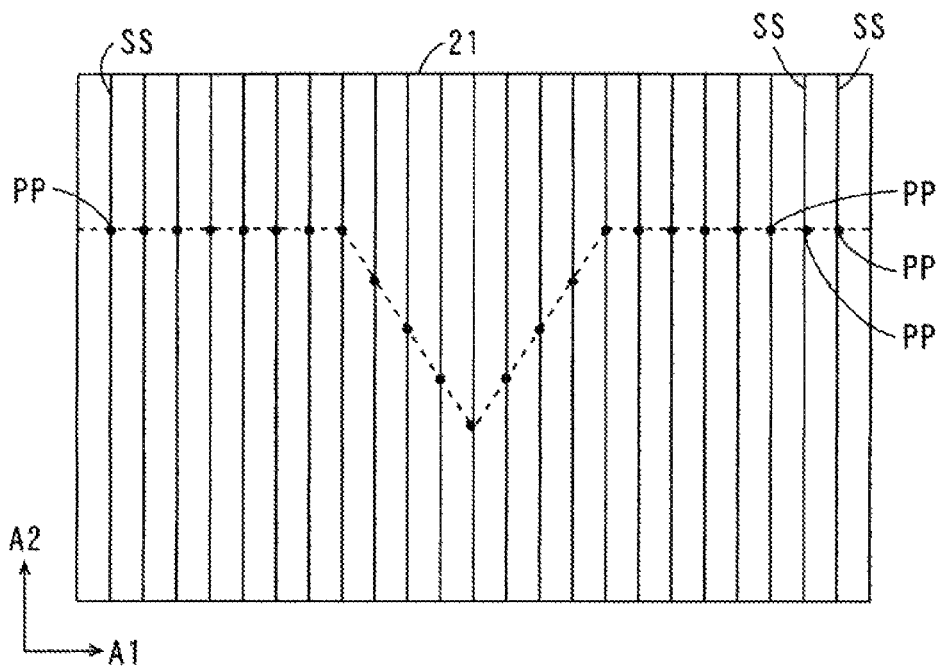
FIGS. 7A and 7B are diagrams showing profile data.
Figure 7B:
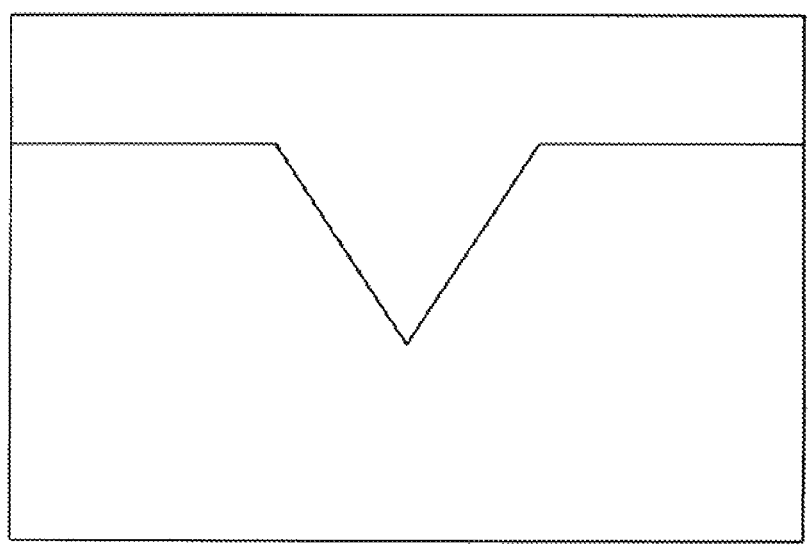

FIG. 7A is a view showing all the peak positions PP in the light-receiving amount distribution of FIG. 5, and FIG. 7B is a diagram showing profile data created based on the peak positions PP of FIG. 7A. As shown in FIGS. 7A and 7B, all the detected peak positions PP are indicated as a continuous line, thereby to obtain profile data showing the sectional shape of the workpiece W.

(1-3) False Peak

As described above, the light reflected in the irradiated area T1 is incident on the light-receiving element 21, whereby the peak representing the height of the irradiated area T1 appears in the waveform data. However, light reflected in a portion other than the irradiated area T1 may be incident on the light-receiving element 21. In this case, a peak (hereinafter referred to as false peak), which is different from the peak (hereinafter referred to as true peak) showing the height of the irradiated area T1, appears in the waveform data. When the false peak in the waveform data is erroneously selected as the peak showing the height of the irradiated area T1, inaccurate profile data is created.

Figure 8A:
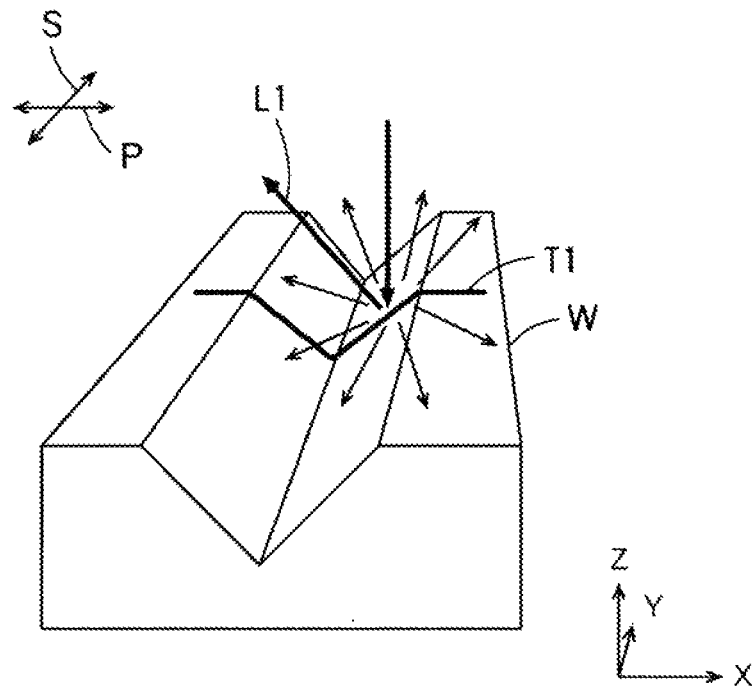
FIGS. 8A and 8B are diagrams for explaining reflection on the surface of the workpiece.
Figure 8B:
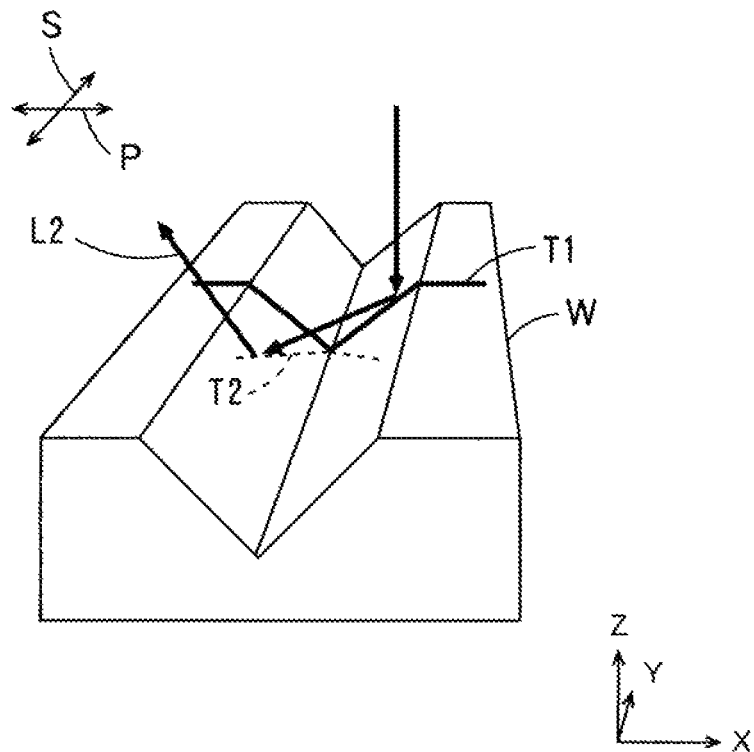
Figure 9:
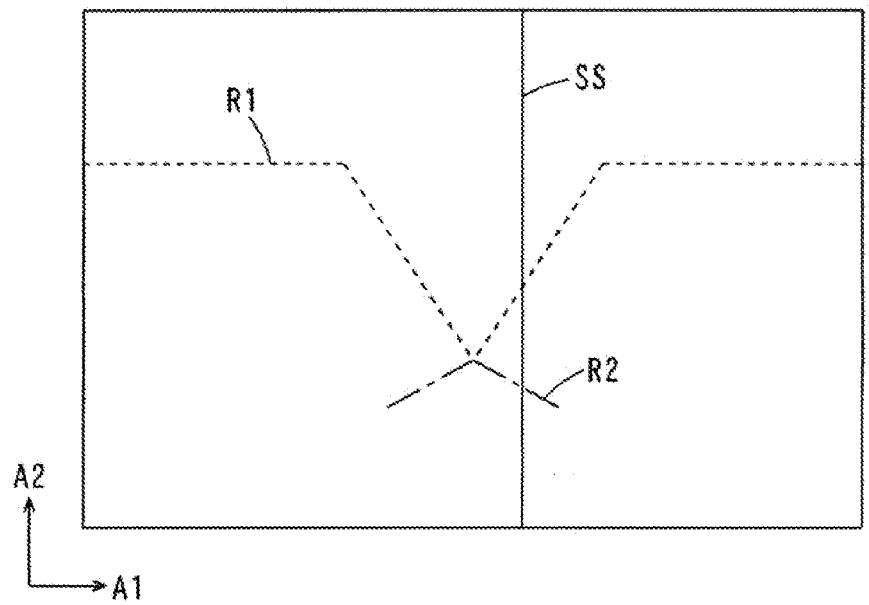
FIG. 9 is a diagram showing another example of the light-receiving amount distribution in the light-receiving element.
Figure 10:
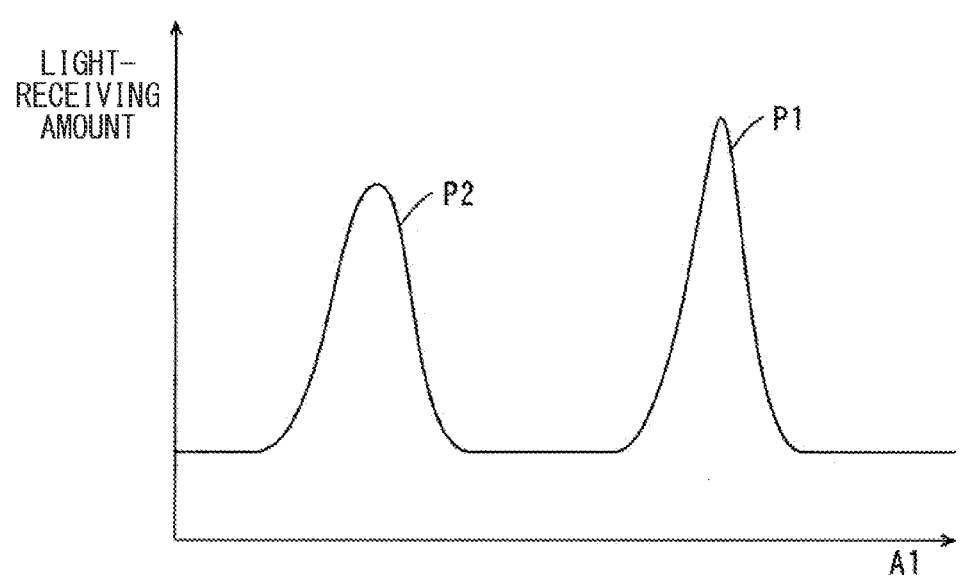
FIG. 10 is a diagram showing waveform data that shows the light-receiving amount distribution of FIG. 9.

FIGS. 8A and 8B are diagrams for explaining reflection on the surface of the workpiece W. FIG. 9 is a diagram showing another example of the light-receiving amount distribution in the light-receiving element 21. FIG. 10 is a diagram showing waveform data of the pixel row SS of FIG. 9.

As shown in FIG. 8A, light with which the workpiece W is irradiated is regularly reflected or diffusely reflected in the irradiated area T1. Herein, the regular reflection refers to reflection in which an incident angle and a reflected angle are the same, and the diffused reflection refers to reflection in which an incident angle and a reflected angle are different. Normally, light regularly reflected in the irradiated area T1 is not incident on the light-receiving element 21, while part of light L1 diffusely reflected in the irradiated area T1 is incident on the light-receiving element 21.

On the other hand, as shown in FIG. 8B, another part of light L2 diffusely reflected in the irradiated area T1 may be regularly reflected in an area (hereinafter referred to as false irradiated area) T2 of the surface of the workpiece W other than irradiated area T1, and then incident on the light-receiving element 21.

When the light is regularly reflected, an intensity of the light does not significantly change before and after the reflection. For this reason, there occurs no significant difference between an intensity of the light L1 that is incident on the light-receiving element 21 from the irradiated area T1 and an intensity of the light L2 that is incident on the light-receiving element 21 from the irradiated area T2. It is to be noted that the present embodiment is an example, and such multiple reflection (more-than-once reflection) can occur under a variety of circumstances. For example, in a case where the workpiece W and the light-projecting/light-receiving part 100a are arranged such that the regularly reflected light is received by the light-receiving element 21 as reflected light from the workpiece W, diffusely reflected light other than the regularly reflected light may be reflected in another area and received by the light-receiving element 21.

Thereby, a light-receiving amount of another area (hereinafter referred to as false light-receiving area) R2 is large other than that of the light-receiving area R1 on the light-receiving surface of the light-receiving element 21, as shown in FIG. 9. In this case, as shown in FIG. 10, a false peak P2 corresponding to the false light-receiving area R2 appears other than a true peak P1 corresponding to the light-receiving area R1 in the waveform data. As a result, the false peak P2 may be erroneously selected as a peak showing the height of the irradiated area T1.

It is to be noted that the light diffusely reflected in the irradiated area T2 has a significantly small intensity as compared with the regularly reflected light. For this reason, the false peak P2 hardly appears as in FIG. 10 even when the light diffusely reflected in the false irradiated area T2 is incident on the light-receiving element 21.

(1-4) Details of Light-Projecting Part and Light-Receiving Part

In the present embodiment, the use of two kinds of light whose polarization directions are different from each other can prevent erroneous detection of the false peak P2. Hereinafter, details thereof will be described.

Figure 11:
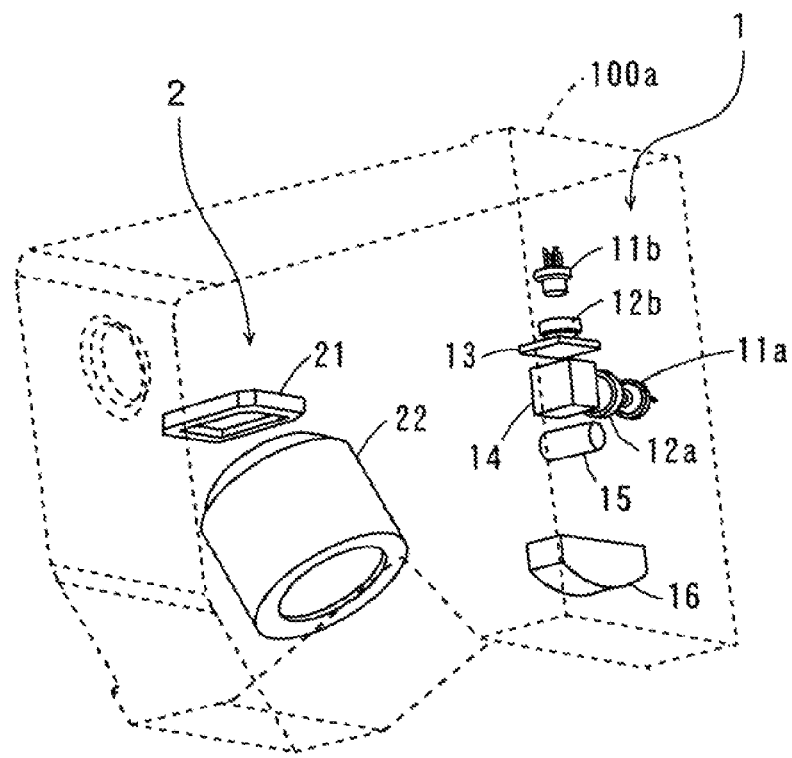
FIG. 11 is a schematic perspective view showing a configuration of a light-projecting/light-receiving part.
Figure 12:
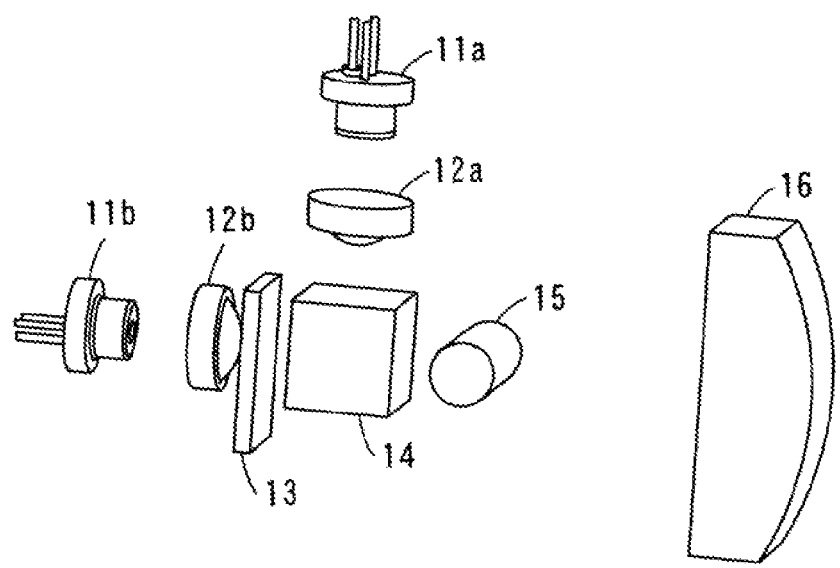
FIG. 12 is a schematic perspective view showing the configuration of the light-projecting part.

FIG. 11 is a schematic perspective view showing a configuration of the light-projecting/light-receiving part 100a. FIG. 12 is a schematic perspective view showing the configuration of the light-projecting part 1. As shown in FIG. 11, the light-projecting part 1 and the light-receiving part 2 are provided inside the light-projecting/light-receiving part 100a. As shown in FIGS. 11 and 12, the light-projecting part 1 includes light-projecting elements 11a, 11b, collimator lenses 12a, 12b, a half-wave plate 13, a PBS (Polarization Beam Splitter) 14, and expansion optical systems (beam expanders) 15, 16. The light-receiving part 2 includes the light-receiving element 21 and the light-receiving lens 22.

Each of the light-projecting elements 11a, 11b includes, for example, a laser diode. Light emitted from each of the light-projecting elements 11a, 11b is linearly polarized light, and a vibration direction of an electric field (hereinafter referred to as polarization direction) is constant. In addition, an LED (light-emitting diode) or the like may be used as each of the light-projecting elements 11a, 11b. In that case, a polarizing plate or the like is arranged in front of each of the light-projecting elements 11a, 11b (in a light-emitted direction), and emitted light from each of the light-projecting elements 11a, 11b is changed to linearly polarized light.

Light emitted from the light-projecting element 11a is guided to the outside of the light-projecting/light-receiving part 100a through the collimator lens 12a, the polarization beam splitter 14, and the expansion optical systems 15, 16. Light emitted from the light-projecting element 11b is guided to the outside of the light-projecting/light-receiving part 100a through the collimator lens 12b, the half-wave plate 13, the polarization beam splitter 14, and the expansion optical systems 15, 16.

Figure 13:
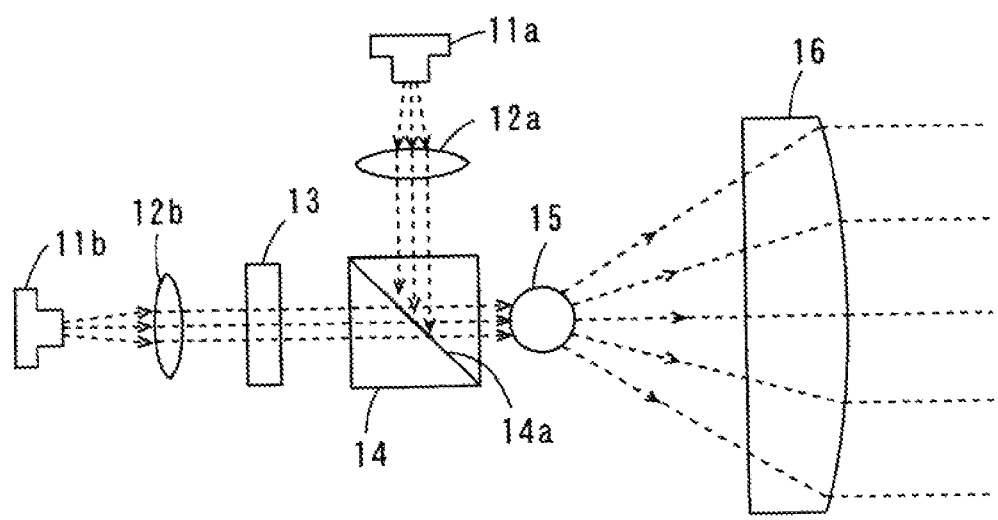
FIG. 13 is a view showing paths of light emitted from light-projecting elements.

FIG. 13 is a view showing paths of light emitted from the light-projecting elements 11a, 11b. As shown in FIG. 13, light emitted from the light-projecting element 11a is shaped to parallel light through the collimator lens 12a, and vertically incident on one surface of the PBS 14. The light incident on the PBS 14 is s-polarized light with respect to a reflected surface 14a of the PBS 14. Therefore, the light is reflected at right angles on the reflected surface 14a of the PBS 14. The reflected light is shaped to band-like light through the expansion optical systems 15, 16, and guided to the outside of the light-projecting/light-receiving part 100a.

Light irradiated from the light-projecting element 11b is shaped to parallel light through the collimator lens 12b, and vertically incident on another surface of the PBS 14 through the half-wave plate 13. In this case, the polarization direction of the light is changed by the half-wave plate 13 by 90 degrees. Thereby, the light incident on the PBS 14 becomes p-polarized light with respect to the reflected surface 14a of the PBS 14, and transmitted through the reflected surface 14a of the PBS 14. The transmitted light is shaped to band-like light through the expansion optical systems 15, 16, and guided to the outside of the light-projecting/light-receiving part 100a.

As described above, light from the light-projecting element 11a and light from the light-projecting element 11b are respectively emitted in a band-like shape as linearly polarized light, whose polarization directions are different from each other by 90 degrees, from the light-projecting/light-receiving part 100a in a common direction. Therefore, selectively emitting light from the light-projecting element 11a and the light-projecting element 11b allow the workpiece W to be selectively irradiated with the two kinds of light (hereinafter referred to as first and second light) whose polarization directions are different by 90 degrees.

In the present example, the workpiece W is irradiated with light emitted from the light-projecting element 11a as the first light, and is irradiated with light emitted from the light-projecting element 11b as the second light. Switching between the first light and the second light is performed by the light-projection controlling part 3 of FIG. 1.

(1-5) Relation Between Polarization Direction and Reflectance

Taking as an example the workpiece W having the groove M1 that extends in the direction Y shown in FIGS. 8A and 8B, the relation between the polarization direction and the reflectance will be described. As shown in FIG. 8A, when assuming that light polarized in the direction X is p-polarized light and light polarized in the direction Y is s-polarized light, the reflectance of light in the direction X on the surface of the workpiece W is different depending upon whether the light with which the workpiece W has been irradiated is the p-polarized light or the s-polarized light. In the workpiece W illustrated in FIGS. 8A and 8B, light reflected in a direction including the direction-X component is further reflected in another area, to generate multiple reflection. At this time, when the direction X is defined as a multiple reflection direction, the reflectance in the multiple reflection direction of the p-polarized light polarized in the direction X is smaller than the reflectance in the multiple reflection direction of the s-polarized light polarized in the direction Y. Especially, the difference in reflectance in the case of regular reflection is significantly larger than the difference in reflectance in the case of diffused reflection.

Further, an intensity of the multiple-reflected light is a value obtained by multiplying the intensity of the irradiation light by the reflectance more than once. For this reason, a ratio of the intensity of the multiple reflected p-polarized light to the intensity of the s-polarized light reflected the same number of times is smaller than a ratio of the intensity of the once-reflected p-polarized light to the intensity of the once-reflected s-polarized light.

On the other hand, for example when the workpiece W illustrated in FIGS. 8A and 8B is rotated around a Z-axis by 90 degrees, the direction Y becomes the multiple reflection direction. In this case, the reflectance in the multiple reflection direction of the s-polarized light polarized in the direction Y is smaller than the reflectance in the multiple reflection direction of the p-polarized light polarized in the direction X.

That is, as for the reflectance in the multiple reflection direction, the reflectance of the light polarized in the same direction as the multiple reflection direction is smaller than the reflectance of the light polarized in an orthogonal direction to the multiple reflection direction within a horizontal plane. Since the multiple reflection direction changes due to a relative arrangement between the light-projecting/light-receiving part 100a and the workpiece W, the magnitude relation also changes between the reflectances of the p-polarized light and the s-polarized light whose polarization components are different from each other by 90 degrees.

In the present embodiment, the light-projecting/light-receiving part 100a and the workpiece W are arranged such that the first light with which the workpiece W is irradiated becomes p-polarized light (light linearly polarized in the direction X) with respect to the surface of the workpiece W and the second light with which the workpiece W is irradiated becomes s-polarized light (light linearly polarized in the direction Y) with respect to the surface of the workpiece W. In that state, the workpiece W is irradiated with the first light and the second light sequentially from the light-projecting/light-receiving part 100a. In this case, waveform data based on the light-receiving amount distribution of the light-receiving element 21 at the time of irradiation with the first light and waveform data based on the light-receiving amount distribution of the light-receiving element 21 at the time of irradiation with the second light are respectively generated by the waveform processing part 7.

There is a difference in light-receiving amount distribution of the light-receiving element 21 between the case of irradiation with the first light and the case of irradiation with the second light. Hence, different waveform data is obtained between the case of irradiation with the first light and the case of irradiation with the second light. Hereinafter, the waveform data in the case of irradiation with the first light is referred to as first waveform data, and the waveform data in the case of irradiation with the second light is referred to as second waveform data.

Figure 14A:
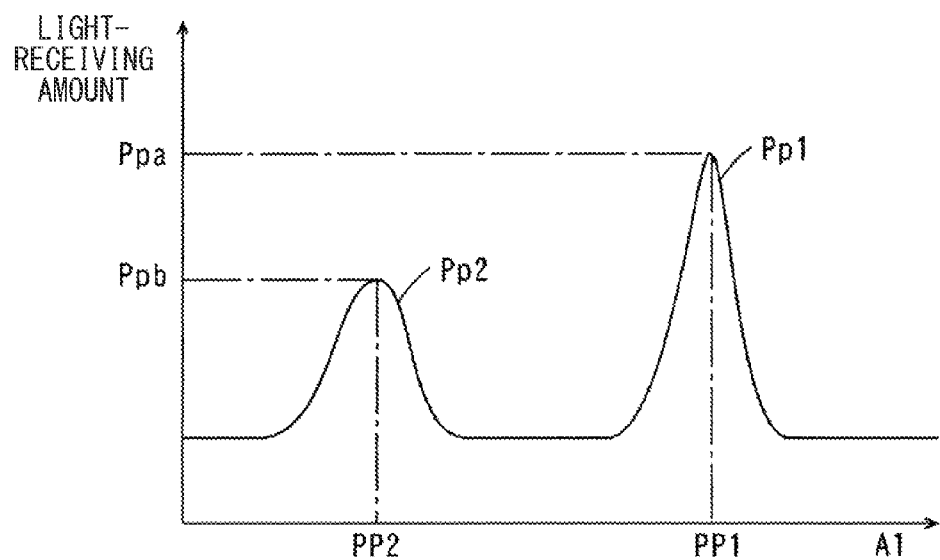
FIGS. 14A and 14B are diagrams showing waveform data in the case of irradiation with first and second light.
Figure 14B:
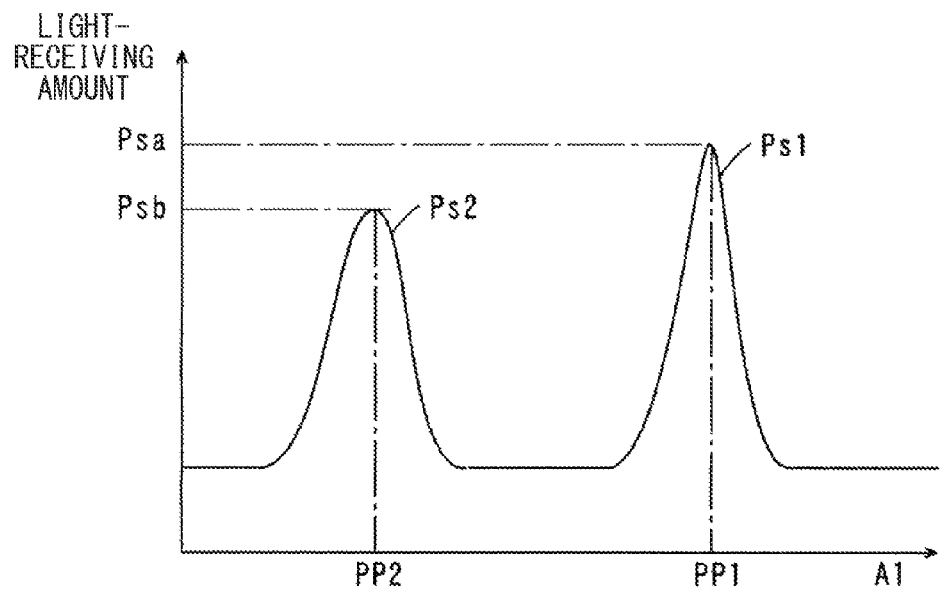

FIG. 14A is a diagram showing first waveform data, and FIG. 14B is a diagram showing second waveform data. The waveform data of FIGS. 14A and 14B are waveform data of the pixel row SS of FIGS. 5 and 9.

In the first waveform data of FIG. 14A, a true peak Pp1 corresponding to the true peak P1 of FIG. 10, and a false peak Pp2 corresponding to the false peak P2 of FIG. 10 appear. In the second waveform data of FIG. 14B, a true peak Ps1 corresponding to the true peak P1 of FIG. 10, and a false peak Ps2 corresponding to the false peak P2 of FIG. 10 appear. A peak position PP1 of the true peak Pp1 of FIG. 14A and a peak position PP1 of the true peak Ps1 of FIG. 14B are almost equal to each other, and a peak position PP2 of the false peak Pp2 of FIG. 14A and a peak position PP2 of the false peak Ps2 of FIG. 14B are almost equal to each other. That is, as a result of irradiating the positions at almost the same heights with the light having different polarization components, a position of the true peak and a position of the false peak are respectively obtained. Although one false peak PP2 appears in the example of FIGS. 14A and 14B, when multiple reflection is generated more than once, more than one false peaks PP2 appear. Hereinafter, the position of the true peak is referred to as a true peak position, and the position of the false peak is referred to as a false peak position.

As shown in FIG. 8A, the light L1 diffusely reflected in the irradiated area T1 is directly incident on the light-receiving element 21, and the true peaks Pp1, Ps1 thus appear. Meanwhile, as shown in FIG. 8B, the light L2 diffusely reflected in the irradiated area T1 is regularly reflected in the irradiated area T2 and incident on the light-receiving element 21, and the false peaks Pp2, Ps2 thus appear.

As described above, in the example of FIGS. 8A and 8B, the reflectance of the first light reflectance as the p-polarized light is smaller than the reflectance of the second light as the s-polarized light. Accordingly, the intensities of the light L1, L2 that are incident on the light-receiving element 21 in the case of irradiation with the first light become smaller than the intensities of the light L1, L2 that are incident on the light-receiving element 21 in the case of irradiation with the second light. Hence, a value Ppa of the true peak Pp1 of FIG. 14A is smaller than a value Psa of the true peak Ps1 of FIG. 14B. Further, a value Ppb of the false peak Pp2 of FIG. 14A is smaller than a value Psb of the false peak Ps2 of FIG. 14B.

Moreover, a ratio of the intensity of the multiple reflected first light (p-polarized light (light with low reflectance) to the intensity of the second light (s-polarized light (light with high reflectance) reflected the same number of times is smaller than a ratio of the intensity of the once-reflected first light to the intensity of the once-reflected second light. This is because, in each repetition of reflection, a light amount decreases at a higher pace in the case of a low reflectance than in the case of a high reflectance. Hence, the ratio of the intensity of the first light to the intensity of the second light decreases as the multiple reflection is repeated.

Further, as described above, the difference between the reflectances of the regularly reflected p-polarized light and s-polarized light is significantly larger than the difference between the reflectances of the diffusely reflected p-polarized light and s-polarized light. For this reason, the difference between the reflectance in the case of regular reflection of the first light and the reflectance in the case of regular reflection of the second light is larger than the difference between the reflectance in the case of diffused reflection of the first light and the reflectance in the case of diffused reflection of the second light. Thereby, a ratio between the intensity of the light L2 regularly reflected in the false irradiated area T2 (FIGS. 8A and 8B) in the case of irradiation with the first light and the intensity of the light L2 regularly reflected in the false irradiated area T2 (FIGS. 8A and 8B) in the case of irradiation with the second light is significantly different from a ratio between the intensity of the light L1 only diffusely reflected in the irradiated area T1 in the case of irradiation with the first light and the intensity of the light L1 only diffusely reflected in the irradiated area T1 in the case of irradiation with the second light.

Thereby, a ratio (Ppb/Psb) of the value Ppb of the false peak Pp2 of FIG. 14A to the value Psb of the false peak Ps2 of FIG. 14B is smaller than a ratio (Ppa/Psa) of the value Ppa of the true peak Pp1 of FIG. 14A to the value Psa of the true peak Ps1 of FIG. 14B.

As described above, the ratio of the value of the false peak in the first waveform data to the value of the false peak in the second waveform data is smaller than the ratio of the value of the true peak in the first waveform data to the value of the true peak in the second waveform data.

It is to be noted that, although the ratio of the light-receiving amount of the first light to the light-receiving amount of the second light has been calculated in the present example, it goes without saying that a ratio of the light-receiving amount of the second light to the light-receiving amount of the first light may be calculated. In this case, the ratio of the light-receiving amount of the second light to the light-receiving amount of the first light increases as the multiple reflection is repeated.

Further, in the positional relation between the workpiece W and the light-projecting/light-receiving part 100a shown in FIGS. 8A and 8B, the first light (p-polarized light) becomes light with low reflectance and the second light (s-polarized light) becomes light with high reflectance, but for example, when the workpiece W is relatively rotated around the Z-axis by 90 degrees with respect to the light-projecting/light-receiving part 100a, the relation between the reflectances of the first and second light is reversed. In this case, the ratio of the light-receiving amount of the first light to the light-receiving amount of the second light increases as the multiple reflection is repeated.

That is, based on the relative arrangement between the workpiece W and the light-projecting/light-receiving part 100a and the magnitude relation of the relative value between the intensity of the first light and the intensity of the second light, it is possible to discriminate between the true peak position due to light reflected only once on the surface of the workpiece W as an object to be measured and the false peak position due to light multiple reflected thereon.

It should be noted that the relative value to be calculated is not restricted to the ratio, but may be a difference or some other value as long as it is a relative value between the light-receiving amount of the first light and the light-receiving amount of the second light. Further, with which light, the first light or the second light, the workpiece W is irradiated first to acquire a light-receiving amount distribution is arbitrary.

In the present embodiment, the ratio of the value of the peak corresponding to the first waveform data to the value of each peak in the second waveform data is calculated by the waveform processing part 7, and based on the calculated ratio, one peak position is detected from the first and second first waveform data.

(1-6) Peak Position Detection Processing

Figure 15:
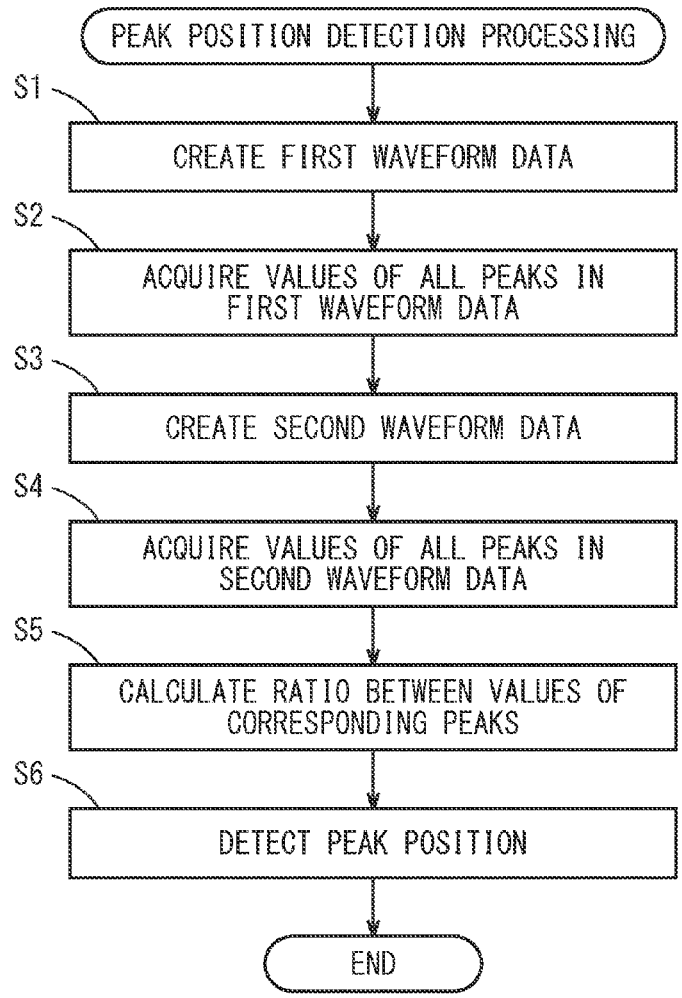
FIG. 15 is a flowchart of peak position detection processing by a waveform processing part.

FIG. 15 is a flowchart of peak position detection processing by the waveform processing part 7. Upon completion of imaging with the first light, the waveform processing part 7 creates a plurality of pieces of first waveform data made up of the light-receiving amount distribution of the first light (step S1). As described above, the first waveform data is created with respect to each pixel row along the direction A2 of FIG. 7A. For this reason, a plurality of pieces of first waveform data corresponding to the plurality of pixel rows arranged in the direction A1 of FIG. 7A are sequentially created.

It is to be noted that the plurality of pieces of first and second waveform data are created since a profile (sectional shape) of the workpiece W is acquired by use of the two-dimensional light-receiving element 21 in the present example, whereas one first waveform data and one second waveform data are created in an optical displacement meter that measures a height of one point on the workpiece W by use of a one-dimensional light-receiving element.

When all the first waveform data are created, the waveform processing part 7 acquires values of all the peaks in all the created first waveform data (step S2). In the example of FIG. 14A, the waveform processing part 7 acquires the value Ppa of the true peak Pp1 and the value Ppb of the false peak Pp2.

Next, upon completion of imaging with the second light, the waveform processing part 7 creates a plurality of pieces of second waveform data made up of the light-receiving amount distribution of the second light (step S3). In this case, as in step S1, a plurality of pieces of second waveform data corresponding to the plurality of pixel rows arranged in the direction A1 of FIG. 7A are sequentially created.

When all the second waveform data are created, the waveform processing part 7 acquires values of all the peaks in all the created second waveform data (step S4). In the example of FIG. 14B, the waveform processing part 7 acquires the value Psa of the true peak Ps1 and the value Psb of the false peak Ps2.

When the values of the peaks in all the first and second waveform data are acquired, the waveform processing part 7 calculates a ratio between the values of the mutually corresponding peaks in the first waveform data and the second waveform data of each pixel row (step S5). In the example of FIGS. 14A and 14B, the waveform processing part 7 calculates the ratio (Ppa/Psa) of the value Ppa of the true peak Pp1 to the value Psa of the true peak Ps1 and the ratio (Ppb/Psb) of the value Ppb of the false peak Pp2 to the value Psb of the false peak Ps2.

Next, based on the calculated ratios, the waveform processing part 7 selects the true peak from each of the first and second waveform data of each pixel row, and detects a position of the true peaks (step S6). In this case, the waveform processing part 7 selects the peaks, whose calculated ratio is maximal, as true peaks and detects a position of the true peaks. In the example of FIGS. 14A and 14B, the waveform processing part 7 detects the peak position PP1 of each of the true peaks Pp1, Ps1. Thereby, the waveform processing part 7 completes the peak position detection processing.

As described above, there is a case where the peaks whose calculated ratio is maximal do not correspond to the true peaks, but the peaks whose calculated ratio is minimal may correspond to the true peaks, depending on the relative arrangement between the workpiece W and the light-projecting/light-receiving part 100a. Therefore, it is preferably configured so as to allow appropriate selection of whether the position of the peaks whose calculated ratio is maximal are recognized as the true peak position or the position of the peaks whose calculated ratio is minimal are recognized as the true peak position. This may be selected by the user, or may be automatically selected based on a result of automatic detection of a multiple reflection direction from an acquired image (e.g., waveform data) or the like.

Further, in the example of FIG. 15, after detection of the positions of all the peaks in each of the first and second data, a ratio between values of peaks at almost the same positions in the first and second waveform data are calculated as a relative value, and the true peak position is specified based on the relative value, but this is not restrictive.

For example, relative values (e.g., ratios) between light-receiving amounts of all pixels shown in the first waveform data and light-receiving amounts of all pixels shown in the second waveform data may be respectively calculated, and new waveform data showing the calculated relative values of light-receiving amounts of all the pixels may be created, to specify the true peak position based on a position and a value of a peak that appears in the created new waveform data. In this case, in place of steps S2, S4, S5 of FIG. 15, there are required a step of creating new waveform data and a step of acquiring a position and a value of a peak that appears in the created new waveform data. In this case as well, a similar effect to that of the example of FIG. 15 is obtained.

(1-7) Effect

In the optical displacement meter 100 according to the present embodiment, the workpiece W is selectively irradiated with the first and second light, whose polarization directions are different from each other, from an irradiation part 1, and the first and second waveform data showing the light-receiving amount distributions of the first and second lights reflected on the workpiece W are respectively created. Ratios between the mutually corresponding peaks in the first and second waveform data are calculated, and based on the calculated ratios, one peak is selected from each of the first and second waveform data.

It is thereby possible to accurately select the true peak due to the first and second light reflected once on the workpiece W among the plurality of peaks in each of the first and second waveform data. It is thus possible to accurately detect the true peak position showing the height of the irradiated area T1 of the workpiece W. As a result, the sectional shape of the workpiece W can be accurately detected.

Further, in the present embodiment, the light-projecting part 1 is configured such that the light is selectively emitted from the light-projecting elements 11a, 11b and the workpiece W is thereby selectively irradiated with the first and second light. Hence, it is possible to acquire the first and second waveform data with a simple configuration under simple control.

Further, in the present embodiment, the light-projecting/light-receiving part 100a and the workpiece W are arranged such that the first light becomes p-polarized light with respect to the irradiated area T1 of the workpiece W and the second light becomes s-polarized light with respect to the irradiated area T2 of the workpiece W. This allows easy and accurate selection of the true peak in each of the first and second waveform data based on the ratio between mutually corresponding peaks in the first and second waveform data.

(1-8) Other Examples of Light-Projecting Part (1-8-1)

Figure 16:
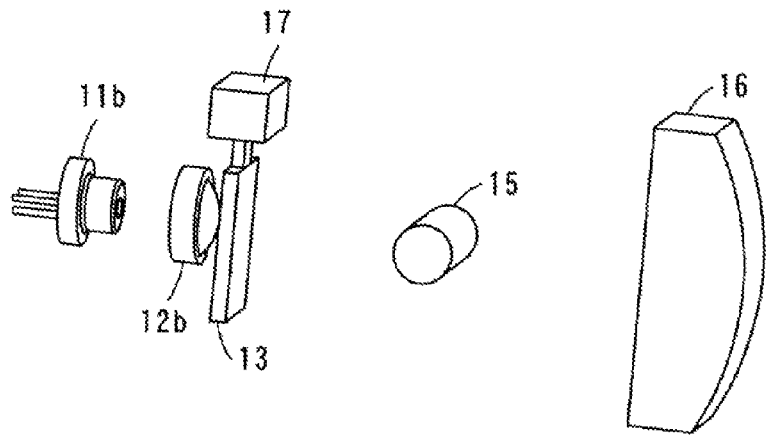
FIG. 16 is a view showing another example of the light-projecting part.

FIG. 16 is a view showing another example of the light-projecting part 1. The light-projecting part 1 of FIG. 16 is different from the light-projecting part 1 of FIG. 12 in the following respect. In the light-projecting part 1 of FIG. 16, a wave plate driving part 17 is provided in place of the light-projecting element 11a, the collimator lens 12a and the PBS 14. As the wave plate driving part 17, for example, a rotary solenoid or a motor is employed.

The wave plate driving part 17 moves the half-wave plate 13 between a position inside an optical path through which light emitted from the light-projecting element 11b passes and a position being off that optical path. In the case of arrangement of the half-wave plate 13 inside the optical path, similarly to the example of FIG. 13, the polarization direction of light emitted from the light-projecting element 11b is changed by the half-wave plate 13. Thereby, the workpiece W is irradiated with that light as the second light. On the other hand, in the case of arrangement of the half-wave plate 13 in a position being off the optical path, the polarization direction of light emitted from the light-projecting element 11b remains unchanged. Thereby, the workpiece W is irradiated with that light as the first light. Therefore, the workpiece W can be selectively irradiated with the first and second light whose polarization directions are different from each other.

In the present example, with only one light-projecting element 11b being provided in the light-projecting part 1, the configuration of the optical system can be simplified as compared with the case of the plurality of light-projecting elements 11a, 11b being provided.

(1-8-2)

Figure 17:
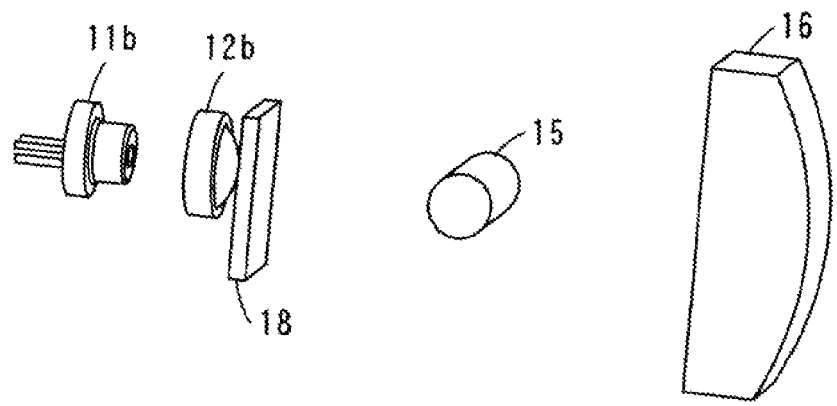
FIG. 17 is a view showing still another example of the light-projecting part.

FIG. 17 is a view showing still another example of the light-projecting part 1. The example of FIG. 17 is different from the example of FIG. 12 in the following respect. In the light-projecting part 1 of FIG. 17, a polarization direction controlling part 18 is provided in place of the light-projecting element 11a, the collimator lens 12a, the half-wave plate 13, and the PBS 14. As the polarization direction controlling part 18, for example, a liquid crystal switch, an EOM (Electro Optic Modulator), or a Farady rotator is employed.

The polarization direction controlling part 18 controls the polarization direction of light emitted from the light-projecting element 11b such that irradiation is performed with the first or second light from the light-projecting/light-receiving part 100a. Hence, it is possible to selectively irradiate the workpiece W with the first and second light whose polarization directions are different from each other.

In the present example, only one light-projecting element 11b is provided in the light-projecting part 1, and differently from the example of FIG. 12, there is no need for providing a space for movement of the half-wave plate 13. Thereby, a space taken up by the light-projecting part 1 further decreases. This can lead to further reduction in size of the light-projecting/light-receiving part 100a.

(1-9) Other Examples of Detection (1-9-1)

As described above, since the reflectance of the first light is smaller than the reflectance of the second light, the ratio of the intensity of the multiple reflected first light to the intensity of the second light reflected the same number of times is smaller than the ratio of the intensity of the once-reflected first light to the intensity of the once-reflected second light. For this reason, when the intensities of the irradiating first and second light are equal to each other, an absolute value of the difference between values of the mutually corresponding true peaks in the first waveform data and the second waveform data is smaller than an absolute value of the difference between values of the mutually corresponding false peaks.

Thereat, in step S5 in the peak position detection processing of FIG. 15, the waveform processing part 7 may calculate the difference between the values of the mutually corresponding peaks in the first waveform data and the second waveform data in place of calculating the ratio between the values of the mutually corresponding peaks in the first waveform data and the second waveform data. In this case, in step S5, the waveform processing part 7 selects peaks, whose calculated absolute value of difference is minimal, as true peaks and detects a position of the true peaks.

In the example of FIGS. 14A and 14B, the waveform processing part 7 calculates a value (Psa−Ppa) obtained by subtracting the value Ppa of the true peak Pp1 from the value Psa of the true peak Ps1 and a value (Psb−Ppb) obtained by subtracting the value Ppb of the false peak Pp2 from the value Psb of the false peak Ps2. In this case, an absolute value of (Psa−Ppa) is smaller than an absolute value of (Psb−Ppb). Thereby, the waveform processing part 7 selects the true peaks Pp1, Ps1, to detect the peak position PP1.

(1-9-2)

In step S7 in the peak position detection processing of FIG. 15, when the difference between the values of the mutually corresponding peaks in the first waveform data and the second waveform data is calculated as described above, each of the peaks may be multiplied by a previously set coefficient, to calculate a difference between the multiplied values.

In this case, the coefficient is previously set in accordance with the value of the peak such that a value of the coefficient decreases with increase in value of the peak. For example, the coefficient is set to 10 in the case of the value of the peak being not smaller than 0 LSB (Least Significant Bit) and not larger than 100 LSB, and the coefficient is set to 9 in the case of the value of the peak being not smaller than 101 LSB and not larger than 200 LSB. Similarly in the case of the value of the peak being not smaller than 201 LSB, the coefficient decreases by 1 with increase in the value of the peak by 100 LSB. In the case of the value of the peak being not smaller than 901 LSB and not larger than 1000 LSB, the coefficient is set to 1.

In the example of FIG. 14A, the waveform processing part 7 decides a coefficient kpa to multiply by in accordance with the value Ppa of the true peak Pp1, and a coefficient ksa to multiply by in accordance with the value Psa of the true peak Ps1. Further, the waveform processing part 7 decides a coefficient kpb to multiply by in accordance with the value Ppb of the false peak Pp2, and a coefficient ksb to multiply by in accordance with the value Psb of the false peak Ps2.

Subsequently, the waveform processing part 7 calculates a difference (ksa·Psa−kpa·Ppa) between a value obtained by multiplying the value Psa of the true peak Ps1 by the coefficient ksa and a value obtained by multiplying the value Ppa of the true peak Pp1 by the coefficient kpa. Further, the waveform processing part 7 calculates a difference (ksb·Psb−kpb·Ppb) between a value obtained by multiplying the value Psb of the false peak Ps2 by the coefficient ksb and a value obtained by multiplying the value Ppb of the false peak Pp2 by the coefficient kpb.

In this case, an absolute value of (ksa·Psa−kpa·Ppa) is smaller than an absolute value of (ksb·Psb−kpb·Ppb). Thereby, the waveform processing part 7 selects the true peaks Pp1, Ps1, to detect the peak position PP1.

As described above, the value of each peak is multiplied by the coefficient previously set in accordance with the value of the peak, thereby to equalize the values of the plurality of peaks in the first and second waveform data. Thereby, even in the case of large variations among the values of the plurality of peaks in the first and second waveform data are large, the true peak can be accurately selected.

(1-9-3)

Figure 18:
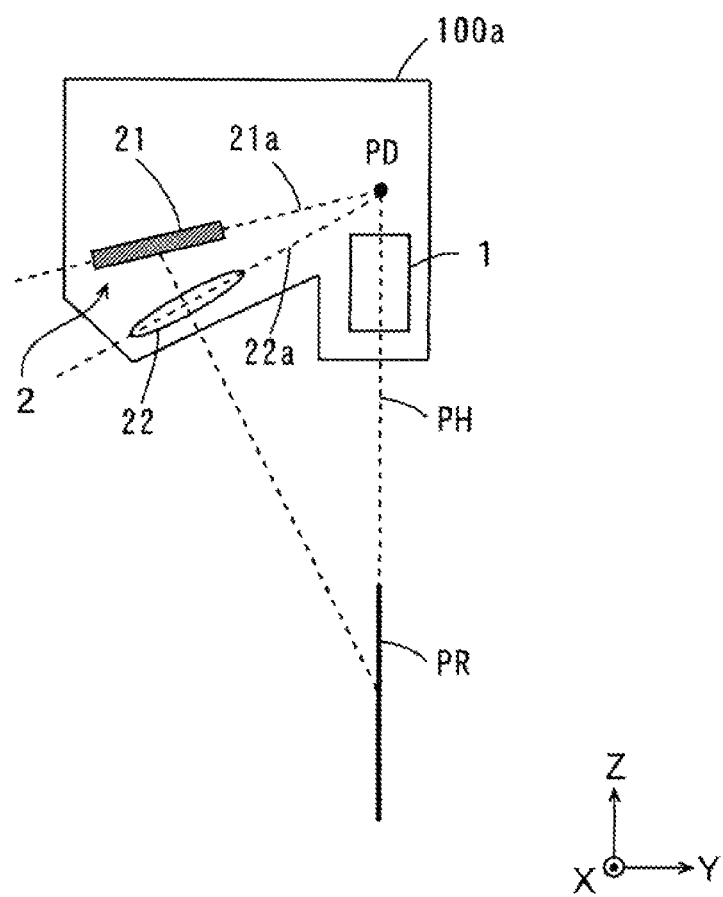
FIG. 18 is a view showing a positional relation among the light-projecting part, the light-receiving element, and a light-receiving lens.
Figure 19:
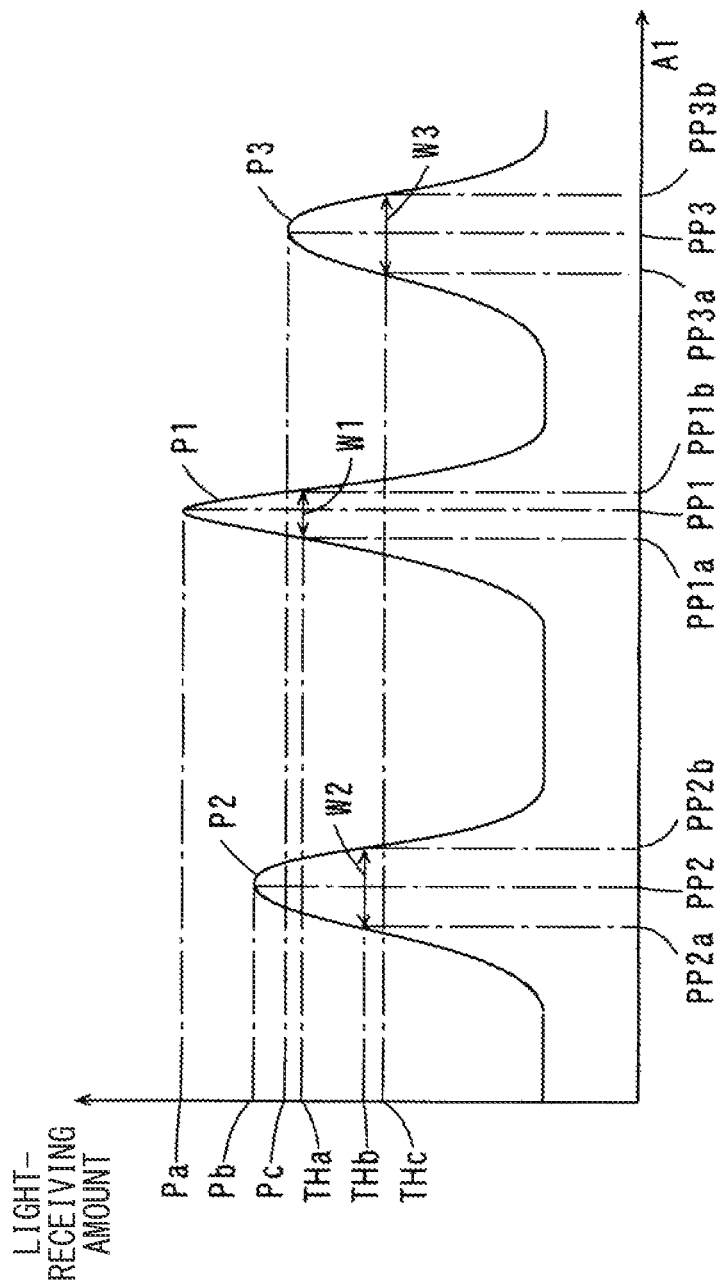
FIG. 19 is a diagram for explaining widths of true peaks and false peaks.

When the number of peaks that appear in each of the first and second waveform data increases, the processing for calculating the ratio or the difference between the values of the mutually corresponding peaks in the first and second waveform data becomes complicated. Thereat, peaks that can be the true peaks may be specified based on widths of the respective peaks that appear in the first and second waveform data, and the ratio or the difference with regard to only the specified peaks may be calculated. FIG. 18 is a view showing the positional relation among the light-projecting part 1, the light-receiving element 21, and the light-receiving lens 22. FIG. 19 is a diagram for explaining widths of the true peaks and the false peaks.

As shown in FIG. 18, the light-receiving element 21, the light-receiving lens 22, and the light-projecting part 1 are separately arranged such that a light-receiving surface 21a of the light-receiving element 21, a principal surface 22a of the light-receiving lens 22, and a flat surface PH along which light emitted from the light-projecting part 1 passes intersect with one another on a common straight line PD. In this case, according to the Scheimpflug principle, an area that comes into focus on the light-receiving surface 21a of the light-receiving element 21 is an area PR on the flat surface PH.

The irradiated area T1 (FIG. 2) on the workpiece W is located within the area PR, and comes into focus on the light-receiving surface 21a of the light-receiving element 21. On the other hand, the false irradiated area T2 is not located within the area PR and does not come into focus on the light-receiving surface 21a of the light-receiving element 21. Thereby, the false peak has a blunter shape than the true peak, and has a larger width than the true peak.

In the example of FIG. 19, the true peak P1 and the false peaks P2, P3 exist at positions PP1, PP2, PP3 of the waveform data. In this case, the false peaks P2, P3 have blunter shapes than a shape of the true peak P1, and the false peaks P2, P3 have larger widths W2, W3 than a width W1 of the true peak P1.

The width of each peak is calculated as follows. For example, values obtained by respectively multiplying a value Pa of the true peak P1 and values Pb, Pc of the false peaks P2, P3 by a constant coefficient (e.g., 0.7) are set as thresholds THa, THb, THc. As the width W1 of the true peak P1, a distance is calculated between a position PP1a at which the light-receiving amount is the threshold THa on one side of the peak position PP1 and which is the nearest to the peak position PP1 and a position PP1b at which the light-receiving amount is the threshold THa on the other side of the peak position PP1 and which is the nearest to the peak position PP1. Similarly, as the width W2 of the false peak P2, a distance is calculated between a position PP2a at which the light-receiving amount is the threshold THb on one side of the peak position PP2 and which is the nearest to the peak position PP2 and a position PP2b at which the light-receiving amount is the threshold THb on the other side of the peak position PP2 and which is the nearest to the peak position PP2. Moreover, as the width W3 of the false peak P3, a distance is calculated between a position PP3a at which the light-receiving amount is the threshold THc on one side of the peak position PP3 and which is the nearest to the peak position PP3 and a position PP3b at which the light-receiving amount is the threshold THc on the other side of the peak position PP3 and which is the nearest to the peak position PP3.

Figure 20:
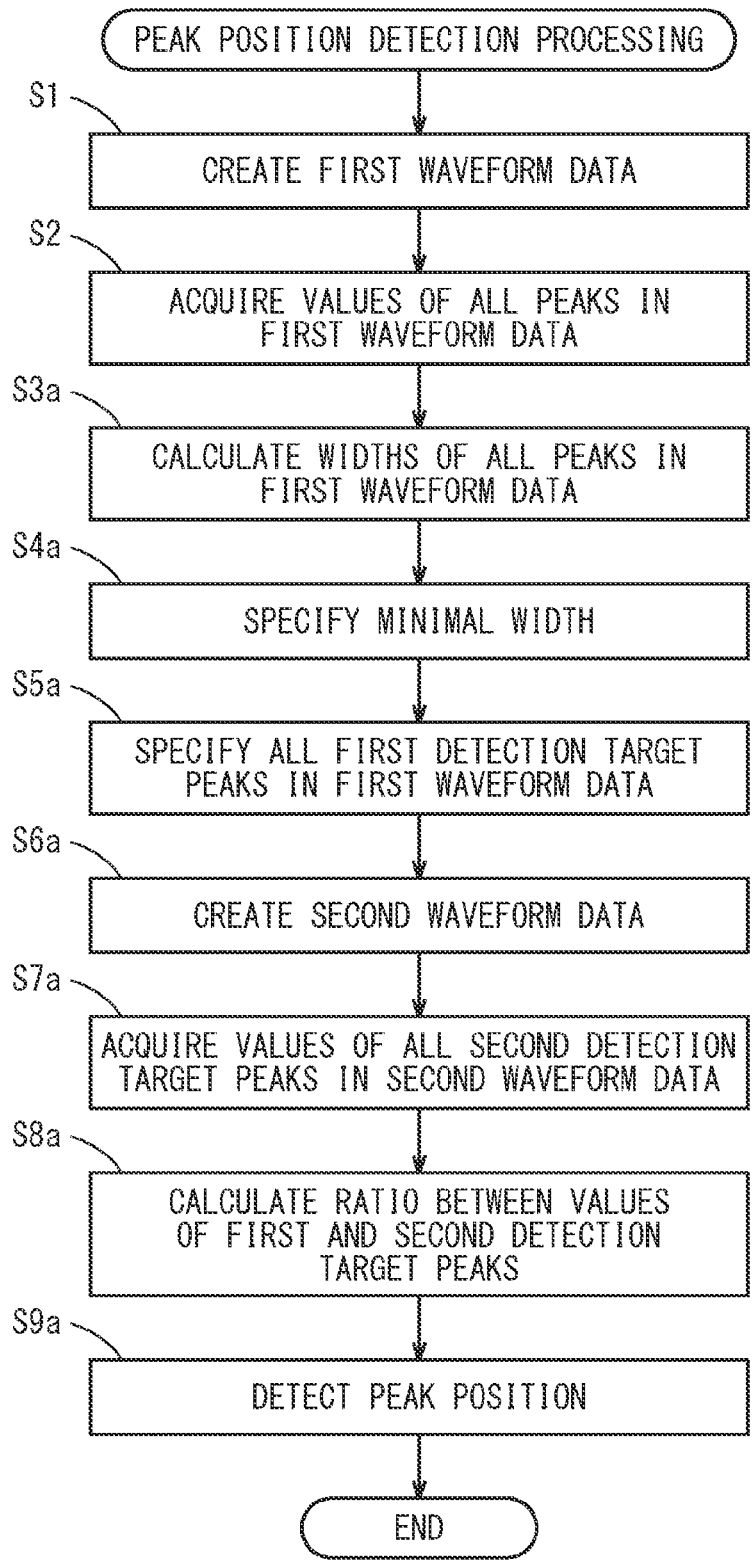
FIG. 20 is a flowchart of another example of the peak position detection processing by the waveform processing part.

FIG. 20 is a flowchart of another example of the peak position detection processing by the waveform processing part 7. The example of FIG. 20 is different from the example of FIG. 15 in the following respect.

In the example of FIG. 20, when acquiring the values of all the peaks in the first waveform data (step S2 of FIG. 20), the waveform processing part 7 calculates widths of all the peaks as described above based on the acquired values of all the peaks (step S3a). Next, the waveform processing part 7 specifies the minimal width among all the calculated widths of the peaks (step S4a).

Herein, as described above, the first waveform data is created with respect to each pixel row along the direction A2 of FIG. 7A. For this reason, a plurality of pieces of first waveform data corresponding to the plurality of pixel rows arranged in the direction A1 of FIG. 7A are sequentially created.

Next, the waveform processing part 7 specifies, as a first detection target peak, a peak having a width with which difference from the minimal width is not larger than the previously set threshold with regard to each first waveform data (step S5a). The first detection target peak, specified in step S5a, can be the true peak and is a detection target for the peak position. When the first detection target peak is specified in all the first waveform data, the waveform processing part 7 creates a plurality of pieces of second waveform data (step S6a).

When all the second waveform data are created, with regard to each of the created second waveform data, the waveform processing part 7 acquires a value of the second detection target peak that has the common peak position with the corresponding first detection target peak in the first waveform data (step S7a).

When the values of the second detection target peaks in all the second waveform data are acquired, the waveform processing part 7 calculates a ratio between values of the mutually corresponding first and second detection target peaks in the first waveform data and the second waveform data of each pixel row (step S8a).

Next, based on the calculated ratios, the waveform processing part 7 selects the true peak from each of the first and second waveform data of each pixel row, and detects a position of the true peak (step S9a). In this case, the waveform processing part 7 selects the peaks, whose calculated ratio is maximal, as true peaks and detects a position of the true peaks. Thereby, the waveform processing part 7 completes the peak position detection processing.

In the present example, the first detection target peak that can be the true peak is previously specified based on the width of each peak in the first waveform data, and only the ratio between the value of the specified first detection target peak and the value of the second detection target peak corresponding thereto is calculated. This eliminates the need for calculating ratios with respect to all the peaks, thereby to allow efficient detection of the true peak position.

It is to be noted that in step S9a of FIG. 20, the difference between the values of the first and second detection target peaks may be calculated in place of calculation of the ratio between the values of the first and second detection target peaks. Further, the values of the first and second detection target peaks may be multiplied by a previously set coefficient, and a difference between values of the multiplied first and second detection target peaks may be calculated.

(1-9-4)

In the above example, the true peak is specified based on the waveform data, but this is not restrictive, and the true peak may be specified based on the light-receiving amount distribution of the light-receiving element 21.

Figure 21:
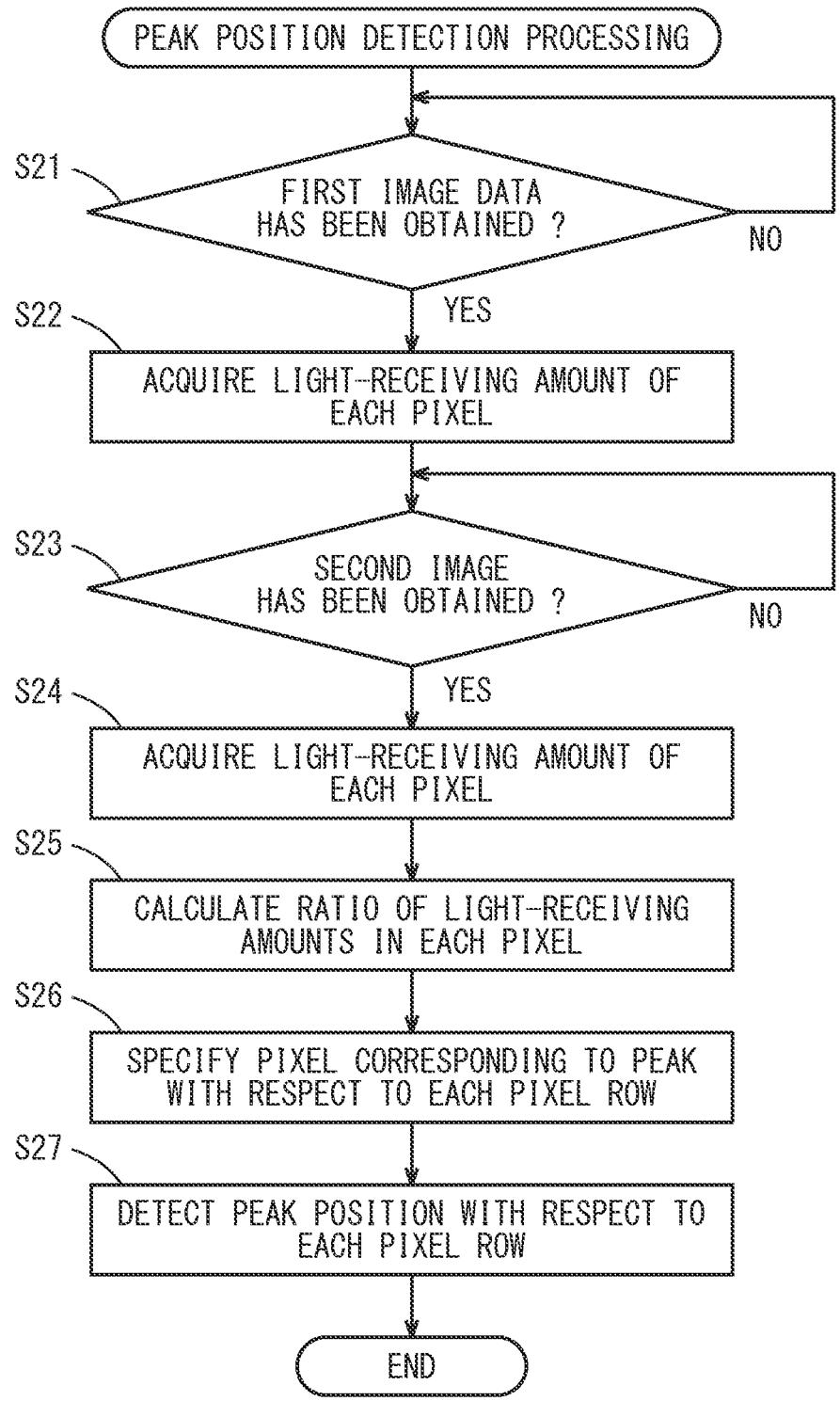
FIG. 21 is a flowchart of peak position detection processing in the case of specifying the true peak based on the light-receiving amount distribution of the light-receiving element.

FIG. 21 is a flowchart of peak position detection processing in the case of specifying the true peak based on the light-receiving amount distribution of the light-receiving element 21. The example of FIG. 21 is different from the example of FIG. 15 in the following respect.

In the present example, the light-receiving amount distribution of the light-receiving element 21 in the case of the workpiece W being irradiated with the first light is given to the light-receiving element 21 as first image data, and the light-receiving amount distribution of the light-receiving element 21 in the case of the workpiece W being irradiated with the second light is given to the light-receiving element 21 as second image data.

As shown in FIG. 21, the waveform processing part 7 determines whether or not the first image data has been obtained (step S21). When the first image data has not been obtained, the waveform processing part 7 stands by until the first image data is obtained. When the first image data has been obtained, the waveform processing part 7 acquires a light-receiving amount of each pixel of the light-receiving element 21 in the case of irradiation with the first light based on the first image data (step S22).

Next, the waveform processing part 7 determines whether or not the second image data has been obtained (step S23). When the second light-receiving amount distribution has not been obtained, the waveform processing part 7 stands by until the second image data is obtained. When the second image data has been obtained, the waveform processing part 7 acquires a light-receiving amount of each pixel of the light-receiving element 21 in the case of irradiation with the second light based on the second image data (step S24).

Next, the waveform processing part 7 calculates a ratio of the light-receiving amount in the case of irradiation with the first light to the light-receiving amount in the case of irradiation with the second light with respect to each pixel of the light-receiving element 21 (step S25). Then, the waveform processing part 7 specifies a pixel corresponding to the peak with respect to each pixel row based on each of the first and second image data (step S26).

Next, based on the ratios calculated in step S25 and the pixel specified in step S26, the waveform processing part 7 selects a pixel corresponding to the true peak with respect to each pixel row, and detects a position of the true peak (step S27). In this case, the waveform processing part 7 compares the ratio of the light-receiving amount in the case of irradiation with the first light to the light-receiving amount in the case of irradiation with the second light with respect to the pixel corresponding to the peak of each pixel row. As a result of the comparison, the waveform processing part 7 selects a pixel at which the ratio between the light-receiving amounts is maximal on each pixel row as a pixel corresponding to the true peak, and detects the position of that pixel as the true peak position. Thereby, the waveform processing part 7 completes the peak position detection processing.

In the present example, the true peak position is detected based on the first and second image data showing the light-receiving amount distribution of the light-receiving element 21. In other words, new image data made up of a relative value between mutually corresponding pixel values (light-receiving amounts) of the first and second image data is created, and the peak position is detected in the waveform data corresponding to each pixel row of the created new image data. From the detected peak positions, the true peak position is selected and detected. As described above, any of the relative value between the first and second image data, the relative value between the waveform data obtained from the first and second image data, and the relative value between the peak positions detected from the first and second image data is calculated, and based on this relative value, it is possible to clearly discriminate between the false peak position due to multiple reflection light and the true peak position due to once-reflected light.

(1-9-5)

In the example shown in FIGS. 8A and 8B, the light-projecting/light-receiving part 100*a* and the workpiece W are arranged such that the first light with which the workpiece W is irradiated becomes p-polarized light with respect to the surface of the workpiece W and the second light with which the workpiece W is irradiated becomes s-polarized light with respect to the surface of the workpiece W, but in a case where the light-projecting/light-receiving part 100*a* and the workpiece W are arranged such that the first light with which the workpiece W is irradiated becomes s-polarized light with respect to the surface of the workpiece W and the second light with which the workpiece W is irradiated becomes p-polarized light with respect to the surface of the workpiece W, the magnitude relation of the reflectance of light in the multiple reflection direction is reversed, and hence a peak position, at which the relative value (ratio of the value of the peak in the first waveform data to the value of the peak in the second waveform data) is minimal, should be specified as the true peak position. Alternatively, the polarization components of the irradiating first and second light can be reversed so as to recognize the peak position, at which the relative value is maximal, as the true peak position.

For example, in step S7 of FIG. 15, the value of the peak in the second waveform data to the value of the peak in the first waveform data is calculated in place of calculation of the value of the peak in the first waveform data to the value of the peak in the second waveform data. Further, in step S8, peaks whose calculated ratio is minimal are selected as the true peaks in place of selection of peaks whose calculated ratio is maximal as the true peaks.

For the sake of removing the multiple reflected light, the existence of restrictions on the relative arrangement between the workpiece W and the light-projecting/light-receiving part 100*a* is not preferred for the user. It is thus preferable that whether the position of the peaks whose relative value is maximal is recognized as the true peak position or the position of the peaks whose relative value is minimal is specified as the true peak position is made appropriately selectable in accordance with the arrangement of the workpiece W and the light-projecting/light-receiving part 100*a*. Alternatively, the user may be allowed to respectively select a polarization component of the first light and a polarization component of the second light.

Moreover, it is most preferable from the viewpoint of removing the multiple reflected light that the polarization components of the first light and the second light are different by 90 degrees in the polarization direction within the horizontal plane. However, it goes without saying the above is not restrictive as long as the reflectances in the multiple reflection direction are different to such a degree that the multiple reflected light can be removed.

(2) Second Embodiment (2-1)

Figure 22:
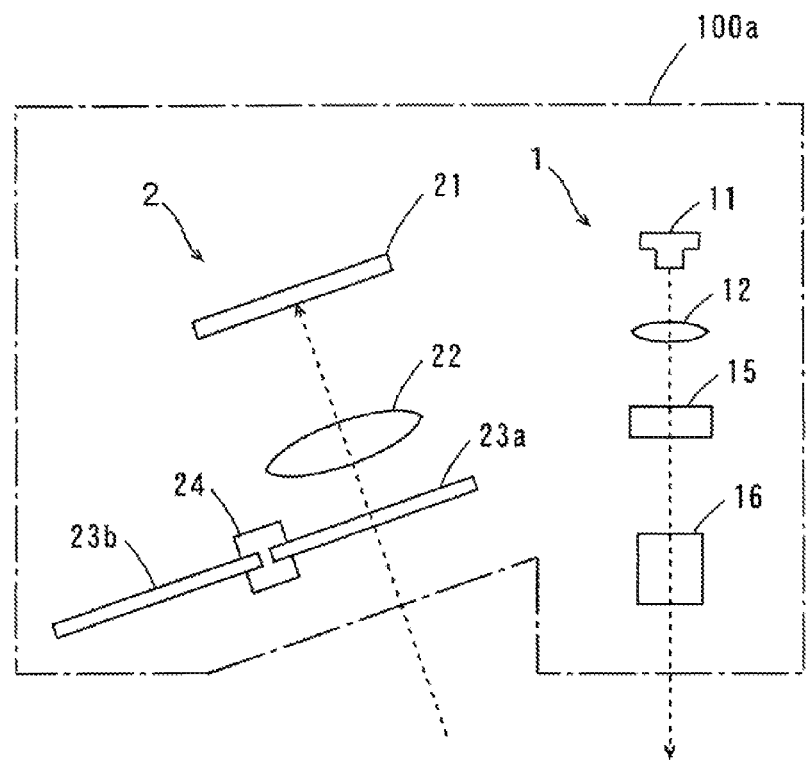
FIG. 22 is a view showing configurations of a light-projecting part and a light-receiving part of an optical displacement meter according to a second embodiment.

As for the optical displacement meter 100 according to the second embodiment of the present invention, a different point from the optical displacement meter 100 according to the first embodiment will be described. FIG. 22 is a view showing configurations of a light-projecting part and a light-receiving part of the optical displacement meter 100 according to the second embodiment.

As shown in FIG. 22, the light-projecting part 1 includes a light-projecting element 11, a collimator lens 12, and the expansion optical systems 15, 16. The light-projecting element 11 emits non-polarized light having a variety of polarization directions. Light emitted from the light-projecting element 11 is shaped to parallel light through the collimator lens 12, and shaped to band-like light through the expansion optical systems 15, 16, to be guided to the outside of the light-projecting/light-receiving part 100*a*.

The light-receiving part 2 includes the light-receiving element 21, the light-receiving lens 22, polarizing plates 23*a*, 23*b*, and a polarizing plate switching part 24. The polarizing plate 23*a*, for example, allows passage of only the first light as p-polarized light with respect to the irradiated area T1 of the workpiece W. The polarizing plate 23*b*, for example, allows passage of only the second light as s-polarized light with respect to the irradiated area T1 of the workpiece W. The polarizing plate switching part 24 selectively arranges either the polarizing plate 23*a* or 23*b* inside an optical path along which the reflected light from the workpiece W passes. As the polarizing plate switching part 24, for example, a rotary solenoid or a motor is employed.

By arrangement of the polarizing plate 23*a* within the optical path by the polarizing plate switching part 24, only the first light out of the reflected light from the workpiece W is transmitted through the polarizing plate 23a. The transmitted first light is incident on the light-receiving element 21 through the light-receiving lens 22. In this case, a light-receiving amount distribution of the first light is obtained by the light-receiving element 21, and first waveform data is created based on the obtained light-receiving amount distribution.

Meanwhile, by arrangement of the polarizing plate 23b within the optical path by the polarizing plate switching part 24, only the second light out of the reflected light from the workpiece W is transmitted through the polarizing plate 23b. The transmitted second light is incident on the light-receiving element 21 through the light-receiving lens 22. In this case, a light-receiving amount distribution of the second light is obtained by the light-receiving element 21, and second waveform data is created based on the obtained light-receiving amount distribution. Using the created first and second waveform data, peak position detection processing is performed by the waveform processing part 7 as in the first embodiment.

(2-2) Effect

In the optical displacement meter 100 according to the present embodiment, the workpiece W is irradiated with common light from the irradiation part 1, and the reflected light from the workpiece W is selectively guided as the first and second light to the light-receiving element 21. Also in this case, as in the first embodiment, the true peak can be accurately selected in each of the first and second waveform data based on the relative value between mutually corresponding peaks in the first and second waveform data. It is thus possible to accurately detect the true peak position showing the height of the irradiated area T1 of the workpiece W. As a result, the sectional shape of the workpiece W can be accurately detected.

(2-3) Other Examples of Light-Projecting Part and Light-Receiving Part

Figure 23:
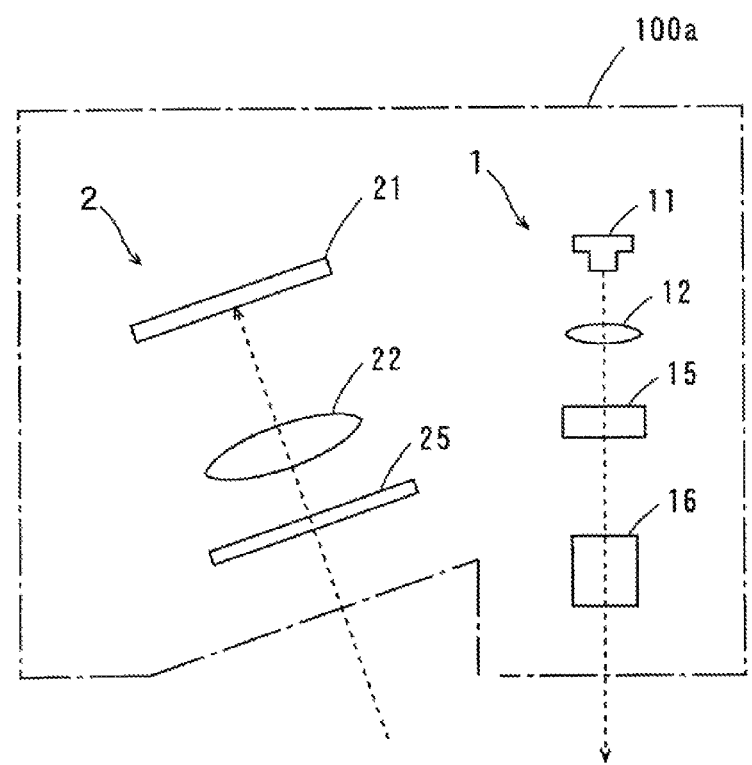
FIG. 23 is a view showing another example of the light-projecting part and the light-receiving part.

FIG. 23 is a view showing another example of the light-projecting part 1 and the light-receiving part 2. The light-projecting part 1 and the light-receiving part 2 of FIG. 23 are different from the light-projecting part 1 and the light-receiving part 2 of FIG. 22 in the following respect.

In the example of FIG. 23, linearly polarized light having a constant polarization direction is emitted from the light-projecting element 11. The polarization direction of the linearly polarized light is set so as to be different from the first and second light, and for example, the direction is set to 45 degrees with respect to the incident surface of the workpiece W.

The light-receiving part 2 includes a polarization component separating part 25 in place of the polarizing plates 23a, 23b and the polarizing plate switching part 24. The polarization component separating part 25 can selectively separate the p-polarization component and s-polarization component from the reflected light from the workpiece W. As the polarization component separating part 25, for example, a liquid crystal switch, an EOM, or a Farady rotator is employed. Light with the p-polarization component separated by the polarization component separating part 25 is received as the first light by the light-receiving element 21, and light with the s-polarization component is received as the second light by the light-receiving element 21. Thereby, the light-receiving amount distributions of the first and second light are obtained.

(3) Other Embodiments (3-1)

In the first and second embodiments, the angle between the polarization direction of the first light and the polarized light of the second light is adjusted to 90 degrees, but this is not restrictive. The polarization direction of the first light and the polarization direction of the second light may be deviated from 90 degrees as long as the true peak position can be selected, based on the relative value between mutually corresponding peaks in the light-receiving amount distribution of the first light and the light-receiving amount distribution of the second light. Further, a polarization component other than the p-polarization component and the s-polarization component may be included in the first and second light.

(3-2)

In the first and second embodiments, the ratio, the difference, or the value computed using the previously set coefficient is employed as the relative value between the value of the peak in the light-receiving amount distribution of the first light and the value of the peak in the light-receiving amount distribution of the second light, but this is not restrictive. A value obtained by a variety of computing by use of the value of the peak in the light-receiving amount distribution of the first light and the value of the peak in the light-receiving amount distribution of the second light may be employed as the relative value as long as the true peak can be accurately selected.

(3-3)

The embodiments of the present invention are not restricted to the optical displacement meter 100 which detects the sectional shape of the workpiece W by the optical-cutting system. For example, similar configurations to the first and second embodiments may be employed in an optical-scanning optical displacement meter which scans an object with point-like light and two-dimensionally detects a displacement of the object based on a light-receiving amount distribution of the reflected light, or an optical displacement meter which irradiates an object with linear light and one-dimensionally detects a displacement of the workpiece W based on the reflected light. In this case as well, it is possible to accurately detect a position of a peak due to light reflected once on the object. Hence, it is possible to accurately detect a displacement of the object.

(4) Correspondence Relation Between Respective Constitutional Elements of the Claims and Respective Parts of the Embodiments Hereinafter, examples of correspondence between respective constitutional elements of the claims and respective parts of the embodiments will be described, but the present invention is not restricted to the following example.

In the above embodiments, the light-projecting part 1 is an example of the light-projecting part, the light-receiving part 2 is an example of the light-receiving part, the first waveform data or the first image data is an example of the first light-receiving amount distribution, the second waveform data or the second image data is an example of the second light-receiving amount distribution, and the waveform processing part 7 is an example of the light-receiving amount distribution acquiring part and the peak position detecting part. Further, the light-projecting element 11a is an example of the first light-projecting element, the light-projecting element 11b is an example of the second light-projecting element, the PBS 14 is an example of the first optical system, the half-wave plate 13 or the PBS 14 are an example of the second optical system, and the half-wave plate 13, the wave plate driving part 17, or the polarization direction controlling part 18 is an example of the polarization component controlling part. Moreover, the light-receiving element 21 is an example of the light-receiving element, and the polarizing plates 23a, 23b, the polarizing plate switching part 24, or the polarization component separating part 25 is an example of the light reception selecting part.

As the respective constitutional elements of the claims, other than the constitutional elements described in the above embodiments, a variety of other constitutional elements each having the configuration or function described in the claims can also be used.

The present invention can be efficiently utilized for detection of a displacement of an object by a triangulation system.

What is claimed is:

1. An optical displacement meter, which detects a peak position of reflected light from an object, to detect a displacement of the object by a triangulation system, the meter comprising:
    a light-projecting part which irradiates the object with light;
    a light-receiving part which receives first light containing a first linear polarization component and second light containing a second linear polarization component that is different from the first linear polarization component, in a mutually discriminable manner;
    a light-receiving amount distribution acquiring part which acquires a light-receiving amount distribution of the first light obtained by the light-receiving part as a first light-receiving amount distribution, and a light-receiving amount distribution of the second light obtained by the light-receiving part as a second light-receiving amount distribution;
    a peak position detecting part which calculates, based on the first and second light-receiving amount distributions acquired by the light-receiving amount distribution acquiring part, discrimination information for discriminating between a position of a false peak due to light reflected on a surface of the object more than once and a position of a true peak due to light reflected thereon once, to specify the true peak position based on the calculated discrimination information; and wherein the displacement of the object corresponds to the true peak position specified by the peak position detecting part.

2. The optical displacement meter according to claim 1, wherein the peak position detecting part detects a peak position in the first light-receiving amount distribution acquired by light-receiving amount distribution acquiring part as a first peak position and detects a peak position in the second light-receiving amount distribution as a second peak position, to calculate as the discrimination information a relative value between light-receiving amounts of the mutually corresponding first and second peak positions.

3. The optical displacement meter according to claim 1, wherein the peak position detecting part calculates as the discrimination information a relative relation between the first and second light-receiving amount distributions acquired by the light-receiving amount distribution acquiring part.

4. The optical displacement meter according to claim 1, wherein
    the light-projecting part is configured so as to irradiate the object with common light containing the first and second linear polarization components, and
    the light-receiving part further includes:
    a light-receiving element; and
    a light reception selecting part which selectively guides, as the first and second light, the common light reflected by the object to the light-receiving element.

5. The optical displacement meter according to claim 1, wherein the discrimination information includes a ratio between a value of the peak that appears in the first light-receiving amount distribution and a value of the peak that appears in the second light-receiving amount distribution.

6. The optical displacement meter according to claim 1, wherein the discrimination information includes a difference between a value of the peak that appears in the first light-receiving amount distribution and a value of the peak that appears in the second light-receiving amount distribution.

7. The optical displacement meter according to claim 1, wherein the discrimination information includes a value obtained by computing by use of values of the peaks that appear in the first and second light-receiving amount distribution and a previously set coefficient.

8. The optical displacement meter according to claim 1, wherein a polarization direction of the first light and a polarization direction of the second light are different from each other by 90 degrees.

9. The optical displacement meter according to claim 1, wherein the light-projecting part is configured so as to selectively irradiate the object with the first and second light.

10. The optical displacement meter according to claim 9, wherein the light-projecting part includes:
    first and second light-projecting elements which generate light;
    a first optical system which guides, as the first light, light that is generated by the first light-projecting element to the object; and
    a second optical system which guides, as the second light, light that is generated by the second light-projecting element to the object.

11. The optical displacement meter according to claim 9, wherein the light-projecting part includes:
    a common light-projecting element which generates light; and
    a polarization component controlling part which controls a polarization component of light that is generated by the common light-projecting element, to irradiate the object with the first and second light.

* * * * *